(12) United States Patent
Yuki

(10) Patent No.: US 11,184,102 B2
(45) Date of Patent: Nov. 23, 2021

(54) APPARATUS AND ADDING AND DROPPING METHOD

(71) Applicant: FUJITSU LIMITED, Kawasaki (JP)

(72) Inventor: Masahiro Yuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/128,733

(22) Filed: Dec. 21, 2020

(65) Prior Publication Data

US 2021/0242956 A1 Aug. 5, 2021

(30) Foreign Application Priority Data

Jan. 30, 2020 (JP) .............................. JP2020-013860

(51) Int. Cl.
*H04J 14/02* (2006.01)
*H04B 10/40* (2013.01)
*H04B 10/25* (2013.01)

(52) U.S. Cl.
CPC .......... *H04J 14/0202* (2013.01); *H04B 10/40* (2013.01); *H04J 14/0221* (2013.01); *H04B 10/25* (2013.01)

(58) Field of Classification Search
CPC .. H04J 14/0221; H04J 14/0202; H04J 14/021; H04J 14/0212; H04B 10/25; H04B 10/40
USPC ........................................................ 398/83
See application file for complete search history.

(56) References Cited

U.S. PATENT DOCUMENTS

| 6,519,064 | B1* | 2/2003 | Fatehi ................... H04J 14/021 398/83 |
| 2002/0135839 | A1* | 9/2002 | Aono .................. H04J 14/0204 398/82 |
| 2003/0099475 | A1* | 5/2003 | Nemoto .............. H04J 14/0245 398/83 |
| 2006/0239684 | A1* | 10/2006 | Oguma ............... H04J 14/0205 398/83 |
| 2007/0274725 | A1* | 11/2007 | Takeyama ............ H04B 10/506 398/93 |
| 2008/0260386 | A1* | 10/2008 | Boduch ............... H04J 14/0219 398/83 |
| 2011/0254608 | A1* | 10/2011 | Kai ...................... H04B 10/2942 327/306 |
| 2012/0219289 | A1 | 8/2012 | Hayashi et al. |
| 2014/0010535 | A1 | 1/2014 | Oi et al. |
| 2018/0191441 | A1* | 7/2018 | Noguchi ............. H04J 14/0221 |
| 2019/0058541 | A1* | 2/2019 | Abe ................... H04B 10/2941 |

FOREIGN PATENT DOCUMENTS

| JP | 2009-33543 | 2/2009 |
| JP | 2011-151584 | 8/2011 |
| JP | 2012-178686 | 9/2012 |
| JP | 2014-14017 | 1/2014 |

* cited by examiner

*Primary Examiner* — Dalzid E Singh
(74) *Attorney, Agent, or Firm* — Staas & Halsey, LLP

(57) ABSTRACT

An apparatus that adds and drops wavelength division multiplexed signal, the apparatus includes a memory and processor. The memory configured to store a first correspondence table indicating relationship with between an optical circuit type information and a first output level target value for a dropping circuit. The processor configured to determine an output level target value for the dropping circuit for each signal wavelength, based on the first correspondence table and optical circuit type information of each signal wavelength.

12 Claims, 35 Drawing Sheets

FIG. 3

|  | MULTIPLEXING UNIT | DEMULTIPLEXING UNIT |
|---|---|---|
| FIRST OPTICAL ADD-DROP MULTIPLEXER | MULTIPLEXING UNIT A, MULTIPLEXING UNIT B | DEMULTIPLEXING UNIT a |
| SECOND OPTICAL ADD-DROP MULTIPLEXER | MULTIPLEXING UNIT c, MULTIPLEXING UNIT d | DEMULTIPLEXING UNIT b |
| THIRD OPTICAL ADD-DROP MULTIPLEXER | MULTIPLEXING UNIT e, MULTIPLEXING UNIT f | DEMULTIPLEXING UNIT C, DEMULTIPLEXING UNIT D |

FIG. 6

|  | OPTICAL SIGNAL A | OPTICAL SIGNAL B |
|---|---|---|
| FIRST OPTICAL ADD-DROP MULTIPLEXER | ADD SIGNAL | ADD SIGNAL |
| SECOND OPTICAL ADD-DROP MULTIPLEXER | THROUGH SIGNAL | THROUGH SIGNAL |
| THIRD OPTICAL ADD-DROP MULTIPLEXER | DROP SIGNAL | DROP SIGNAL |

FIG. 7

|  | MULTIPLEXING UNIT A | MULTIPLEXING UNIT B |
|---|---|---|
| FIRST OPTICAL ADD-DROP MULTIPLEXER | THIRD MULTIPLEXING UNIT | THIRD MULTIPLEXING UNIT |
| SECOND OPTICAL ADD-DROP MULTIPLEXER | SECOND MULTIPLEXING UNIT | SECOND MULTIPLEXING UNIT |
| THIRD OPTICAL ADD-DROP MULTIPLEXER | FIRST MULTIPLEXING UNIT | FIRST MULTIPLEXING UNIT |

FIG. 8

|  | MULTIPLEXING UNIT A | MULTIPLEXING UNIT B |
|---|---|---|
| INTENSITY CHANGE RATE (dB) | -4 | -10 |

FIG. 9

|  | DEMULTIPLEXING UNIT C | DEMULTIPLEXING UNIT D |
|---|---|---|
| INTENSITY CHANGE RATE (dB) | -4 | -10 |

FIG. 10

| | PASSING ORDER | UNIT | OPTICAL SIGNAL A OUTPUT LEVEL (dBm) | OPTICAL SIGNAL B OUTPUT LEVEL (dBm) |
|---|---|---|---|---|
| | 1 | TRANSMITTER | 0 | 0 |
| FIRST OPTICAL ADD-DROP MULTIPLEXER | 2 | MULTIPLEXING UNIT | -4 | -10 |
| | 3 | ADDING UNIT | -17 | -20 |
| | 4 | POST-OPTICAL AMPLIFYING UNIT | 5 | 2 |
| | 5 | OPTICAL LINE | -15 | -18 |
| SECOND OPTICAL ADD-DROP MULTIPLEXER | 6 | PRE-OPTICAL AMPLIFYING UNIT | 7 | 4 |
| | 7 | DROPPING UNIT | -3 | -5 |
| | 8 | ADDING UNIT | -17 | -20 |
| | 9 | POST-OPTICAL AMPLIFYING UNIT | 5 | 2 |
| | 10 | OPTICAL LINE | -15 | -18 |
| THIRD OPTICAL ADD-DROP MULTIPLEXER | 11 | PRE-OPTICAL AMPLIFYING UNIT | 7 | 4 |
| | 12 | DROPPING UNIT | -3 | -5 |
| | 13 | DEMULTIPLEXING UNIT | 7 | -15 |

FIG. 12

| | PASSING ORDER | UNIT | OPTICAL SIGNAL A OUTPUT LEVEL (dBm) | OPTICAL SIGNAL B OUTPUT LEVEL (dBm) |
|---|---|---|---|---|
| | 1 | TRANSMITTER | 0 | 0 |
| FIRST OPTICAL ADD-DROP MULTIPLEXER | 2 | MULTIPLEXING UNIT | -4 | -10 |
| | 3 | ADDING UNIT | -20 | -20 |
| | 4 | POST-OPTICAL AMPLIFYING UNIT | 2 | 2 |
| | 5 | OPTICAL LINE | -18 | -18 |
| SECOND OPTICAL ADD-DROP MULTIPLEXER | 6 | PRE-OPTICAL AMPLIFYING UNIT | 4 | 4 |
| | 7 | DROPPING UNIT | -5 | -5 |
| | 8 | ADDING UNIT | -20 | -20 |
| | 9 | POST-OPTICAL AMPLIFYING UNIT | 2 | 2 |
| | 10 | OPTICAL LINE | -18 | -18 |
| THIRD OPTICAL ADD-DROP MULTIPLEXER | 11 | PRE-OPTICAL AMPLIFYING UNIT | 4 | 4 |
| | 12 | DROPPING UNIT | -5 | -5 |
| | 13 | DEMULTIPLEXING UNIT | -9 | -15 |

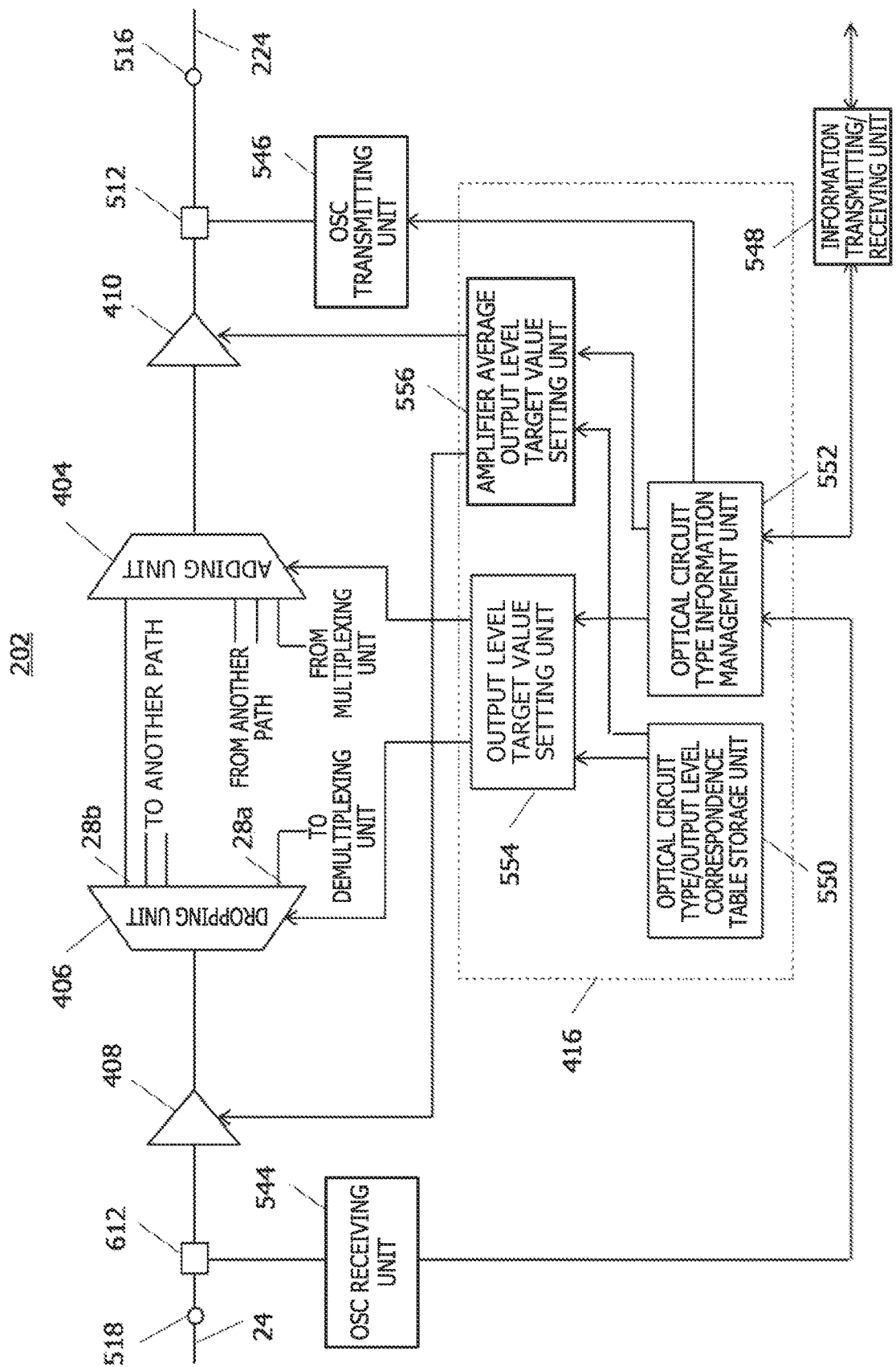

FIG. 21

| CHANNEL NUMBER | Path SETTING | OPTICAL CIRCUIT TYPE OF Add UNIT | OPTICAL CIRCUIT TYPE OF Drop UNIT |
|---|---|---|---|
| 1 | Add | CDC MCS | - |
| 2 | Add | CDC WSS | - |
| 3 | Thru | CD SPL | - |
| 4 | Drop | CDC WSS | CDC WSS |
| ⋮ | ⋮ | ⋮ | ⋮ |
| 100 | Thru | CDC MCS | - |

FIG. 23

| OPTICAL CIRCUIT TYPE OF Add UNIT | TARGET VALUE (dBm) FOR DROPPING UNIT 574 | | | | |
|---|---|---|---|---|---|
| | Thru CH | Drop CH | | | |
| | | OPTICAL CIRCUIT TYPE OF Drop UNIT | | | |
| | | CD SPL | CDC MCS | ... | CDC WSS 902 |
| CD SPL | -4 | -4 | -4 | ... | -4 |
| CDC MCS | -5 | -5 | -5 | ... | -5 |
| ... | ... | ... | ... | ... | ... |
| CDC WSS 900 | -3 | -3 | -3 | ... | -3 904 |

| CHANNEL NUMBER | Path SETTING | TARGET VALUE FOR POST-WSS |
|---|---|---|
| 1 | Add | -20 |
| 2 | Add | -17 |
| 3 | Thru | -19 |
| 4 | Drop | — |
| ⋮ | ⋮ | ⋮ |
| 100 | Thru | -20 |

FIG. 28

| CHANNEL NUMBER | Path SETTING | TARGET VALUE FOR PRE-WSS |
|---|---|---|
| 1 | Add | — |
| 2 | Add | — |
| 3 | Thru | -4 |
| 4 | Drop | -3 |
| ⋮ | ⋮ | ⋮ |
| 100 | Thru | -5 |

| OPTICAL CIRCUIT TYPE OF Add UNIT | TRPN TYPE | POST-WSS Add CH |
|---|---|---|
| CD SPL | HIGH-OUTPUT TYPE TRPN | -17 |
| CDC MCS | HIGH-OUTPUT TYPE TRPN | -18 |
| ... | ... | ... |
| CDC WSS | HIGH-OUTPUT TYPE TRPN | -15 |
| ... | ... | ... |
| CD SPL | NORMAL TYPE TRPN | -19 |
| CDC MCS | NORMAL TYPE TRPN | -20 |
| ... | ... | ... |
| CDC WSS | NORMAL TYPE TRPN | -17 |
| ... | ... | ... |
| CD SPL | LOW-OUTPUT TYPE TRPN | -21 |
| CDC MCS | LOW-OUTPUT TYPE TRPN | -22 |
| ... | ... | ... |
| CDC WSS | LOW-OUTPUT TYPE TRPN | -19 |

| OPTICAL CIRCUIT TYPE OF Drop UNIT | TRPN TYPE | PRE-WSS |
| --- | --- | --- |
| | | Drop CH |
| CD SPL | HIGH-SENSITIVITY TYPE TRPN | -5 |
| CDC MCS | HIGH-SENSITIVITY TYPE TRPN | -5 |
| ... | ... | ... |
| CDC WSS | HIGH-SENSITIVITY TYPE TRPN | -6 |
| ... | ... | ... |
| CD SPL | NORMAL TYPE TRPN | -3 |
| CDC MCS | NORMAL TYPE TRPN | -3 |
| ... | ... | ... |
| CDC WSS | NORMAL TYPE TRPN | -4 |
| ... | ... | ... |
| CD SPL | LOW-SENSITIVITY TYPE TRPN | 0 |
| CDC MCS | LOW-SENSITIVITY TYPE TRPN | 0 |
| ... | ... | ... |
| CDC WSS | LOW-SENSITIVITY TYPE TRPN | -1 |

FIG. 34

| OPTICAL CIRCUIT TYPE OF Add UNIT | OUTPUT LEVEL TARGET VALUE FOR PRE-OPTICAL AMPLIFYING UNIT [dBm] | OUTPUT LEVEL TARGET VALUE FOR POST-OPTICAL AMPLIFYING UNIT [dBm] |
|---|---|---|
| CD SPL | 5 | 3 |
| CDC MCS | 4 | 2 |
| ... | | |
| CDC WSS | 7 | 5 |

APPARATUS AND ADDING AND DROPPING METHOD

CROSS-REFERENCE TO RELATED APPLICATION

This application is based upon and claims the benefit of priority of the prior Japanese Patent Application No. 2020-13860, filed on Jan. 30, 2020, the entire contents of which are incorporated herein by reference.

FIELD

The embodiments discussed herein are related to an optical add-drop multiplexer, adding and dropping method and an optical communication system.

BACKGROUND

In order to expand the transmission capacity per optical fiber, wavelength division multiplexing (WDM) transmission technique that puts distinct signals on each of a plurality of wavelengths to multiplex the put distinct signals, and transmits the multiplexed signal as WDM signal light on an optical fiber has been generalized.

Furthermore, in ring networks and mesh networks, the reconfigurable optical add-drop multiplexer (ROADM) device technique that enables free switching between paths for each signal wavelength has also been generalized.

This optical add-drop multiplexer separates an optical signal having a specific wavelength from an optical signal wavelength-multiplexed by another optical node, and multiplexes the remaining portion with a new optical signal to transmit the multiplexed signal to the next optical node. For example, the optical add-drop multiplexer drops and extracts a part of an optical signal sequentially transmitted from one optical node to another optical node, and further adds a new optical signal into the remaining optical signal flow to transmit the obtained signal to the next optical node (for example, refer to Japanese Laid-open Patent Publication No. 2014-14017).

The optical signal separated by the optical add-drop multiplexer are demultiplexed into optical signals having different wavelengths from each other by a demultiplexer, and then converted into an electrical signal by a receiver. The new optical signal to be transmitted to the next optical node by the optical add-drop multiplexer is generated by a transmitter and multiplexed by a multiplexer, and then added into the remaining optical signal flow.

Note that, regarding the optical node, a technique of altering the power level of the wavelength division multiplexed signal in accordance with the target value has been reported (for example, Japanese Laid-open Patent Publication No. 2012-178686). Moreover, regarding the optical transmission device, a technique of calculating the power per wavelength by dividing the power detected by a detection mechanism by the number of wavelengths has been reported (for example, Japanese Laid-open Patent Publication No. 2011-151584).

SUMMARY

According to an aspect of the embodiments, an apparatus that adds and drops wavelength division multiplexed signal, the apparatus includes a memory configured to store a first correspondence table indicating relationship with between an optical circuit type information and a first output level target value for a dropping circuit, and a processor configured to determine an output level target value for the dropping circuit for each signal wavelength, based on the first correspondence table and optical circuit type information of each signal wavelength. . . .

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a table illustrating a multiplexing unit and a demultiplexing unit included in each optical add-drop multiplexer in case 1;

FIG. 6 is a table illustrating the types of optical signals A and B in each optical add-drop multiplexer;

FIG. 7 is a diagram illustrating the types of multiplexing units A and B in each optical add-drop multiplexer;

FIG. 8 is a table illustrating an example of intensity change rates of the multiplexing units A and B;

FIG. 9 is a diagram illustrating an example of intensity change rates of demultiplexing units C and D;

FIG. 10 is a table illustrating an example of transition in the intensity of the optical signal A and the intensity of the optical signal B;

FIG. 12 is a table illustrating an example of transition in the intensity of the optical signal when a first output level target value is set uniformly, regardless of the intensity change rate of a multiplexing unit through which the optical signal passes;

FIG. 18 is an example of a functional block diagram of the optical add-drop multiplexer 202 according to the second embodiment;

FIG. 21 is a table 570 illustrating an example of information managed by an optical circuit type information management unit 552;

FIG. 23 is a diagram illustrating an example of information recorded in the optical circuit type/output level correspondence table storage unit 550;

FIG. 27 is a diagram illustrating an example of a table 590 in which the result of step S8 is recorded;

FIG. 28 is a diagram illustrating an example of another table 591 in which the result of step S8 is recorded;

FIG. 31 is a table 910 illustrating an example of first output level target values according to a second modification example of the second embodiment;

FIG. 32 is a table 916 illustrating an example of second output level target values according to a third modification example of the second embodiment;

FIG. 34 is a diagram illustrating target values of output levels of each of a pre-optical amplifying unit and a post-optical amplifying unit.

DESCRIPTION OF EMBODIMENTS

In prior art, an arrayed waveguide grating (AWG) has been used for the multiplexer and the demultiplexer in early optical add-drop multiplexers. However, in recent advanced optical add-drop multiplexers, a variety of optical circuits such as a multicast optical switch (MCS) and a contentionless wavelength selective switch (WSS) are used for the demultiplexer and the multiplexer (for example, refer to Japanese Laid-open Patent Publication No. 2009-033543). Accordingly, the recent optical add-drop multiplexers (which are optical nodes) include a plurality of multiplexers of different types from each other. A new optical signal to be added into the flow of an optical signal transferred in an optical network is subject to loss as the new optical signal passes through the multiplexer. For this reason, in the recent optical add-drop multiplexers including a plurality of multiplexers of different types from each other, the intensities of new optical signals to be added into the flow of optical signals become uneven.

Thus, in order to mitigate the unevenness produced in the intensities of the optical signals within an optical signal flow, respective optical signals to be output from distinct multiplexers are attenuated to a certain intensity before being added into the optical signal flow. As a consequence of this attenuation, the intensity of an optical signal output from a multiplexer with a large loss and the intensity of an optical signal output from a multiplexer with a small loss are made even.

However, such optical add-drop multiplexers have a difficulty in that the optical signal-to-noise ratio (OSNR) of an optical signal that has passed through the multiplexer with a small loss is low to the same extent as the optical signal-to-noise ratio of an optical signal that has passed through the multiplexer with a large loss. This is because, in order to make the intensities of the optical signals even, the optical signal that has passed through the multiplexer with a small loss is too much attenuated. Too much attenuation promotes deterioration of the optical signal-to-noise ratio by the optical amplifier.

In view of this, the present embodiments aim to solve such a difficulty.

Hereinafter, the embodiments will be described with reference to the drawings. However, the technical scope of the present embodiments is not limited to these examples, but extends to the matters described in the claims and equivalents thereof. Even in different drawings, portions or the like having the same structure are denoted by the same reference signs, and the description thereof will be omitted.

First Embodiment (1) Configuration

Figure 1:
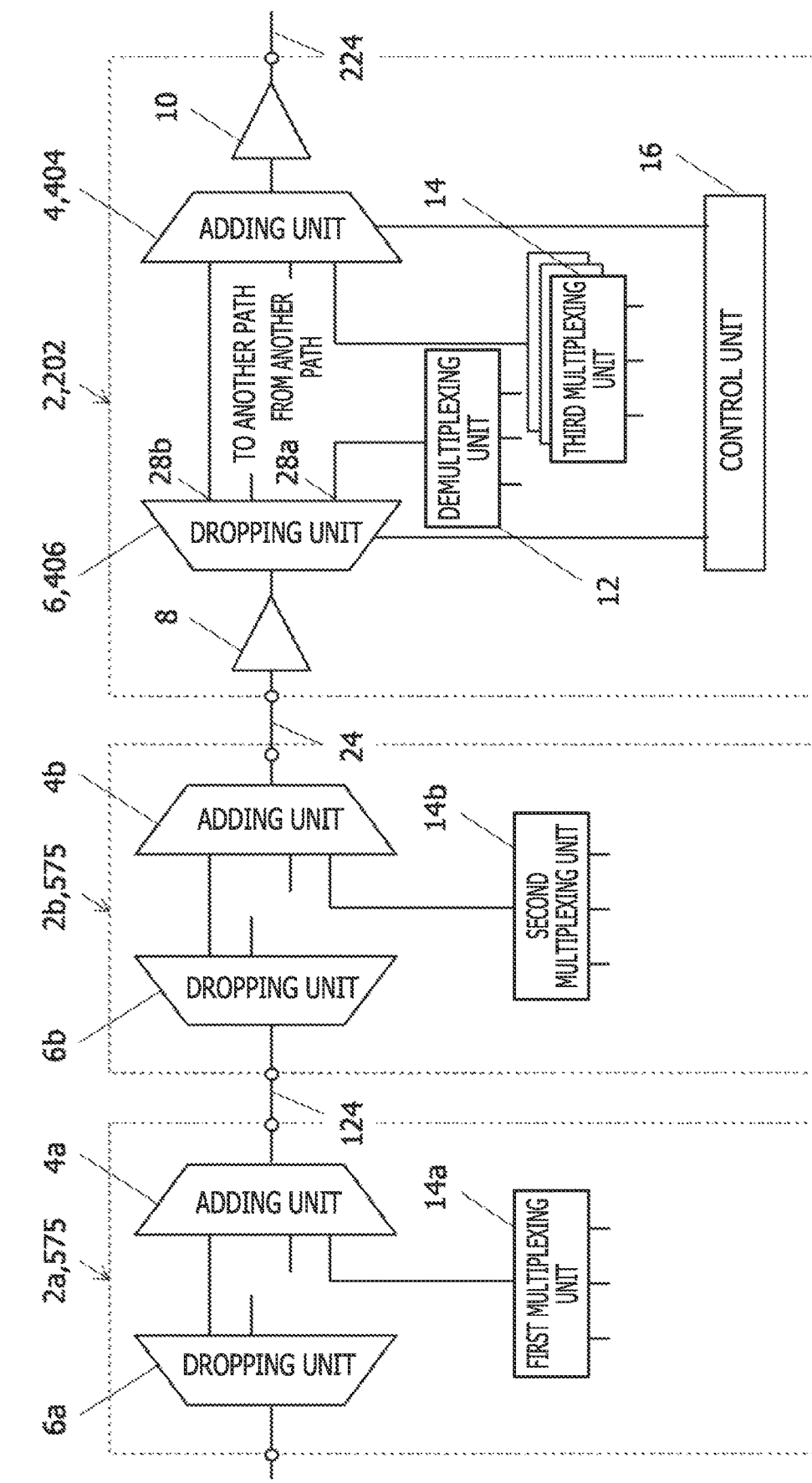
FIG. 1 is a functional block diagram illustrating an example of an optical communication system 5 including an optical add-drop multiplexer 2 according to a first embodiment.

FIG. 1 is a functional block diagram illustrating an example of an optical communication system 5 (which is an optical network) including an optical add-drop multiplexer 2 according to a first embodiment.

The optical communication system (for example, an optical add-drop system) 5 of the first embodiment is a system including a first optical add-drop multiplexer 2a, a second optical add-drop multiplexer 2b, and an optical add-drop multiplexer 2 (hereinafter also referred to as a third optical add-drop multiplexer). In FIG. 1, some of the functional blocks included in the first optical add-drop multiplexer 2a (for example, a demultiplexing unit and a control unit) are omitted. The same applies to the second optical add-drop multiplexer 2b. The first optical add-drop multiplexer 2a, the second optical add-drop multiplexer 2b, and the optical add-drop multiplexer 2 are, for example, reconfigurable optical add-drop multiplexers (ROADMs).

As illustrated in FIG. 1, the optical add-drop multiplexer 2 includes a pre-optical amplifying unit 8, a dropping unit 6, an adding unit 4, a post-optical amplifying unit 10, a demultiplexing unit 12, a plurality of third multiplexing units 14, and a control unit 16. The first optical add-drop multiplexer 2a includes a dropping unit 6a, an adding unit 4a, a pre-optical amplifying unit (not illustrated), a post-optical amplifying unit (not illustrated), a demultiplexing unit (not illustrated), and a first multiplexing unit 14a, and a control unit (not illustrated). The second optical add-drop multiplexer 2b includes a dropping unit 6b, an adding unit 4b, a pre-optical amplifying unit (not illustrated), a post-optical amplifying unit (not illustrated), a demultiplexing unit (not illustrated), and a second multiplexing unit 14b, and a control unit (not illustrated).

The adding units 4, 4a, and 4b accept inputs of a plurality of optical signals, and multiplex the plurality of input optical signals while controlling the intensity of each optical signal included in the plurality of input optical signals. The dropping units 6, 6a, and 6b output each optical signal included in a plurality of input optical signals from one of a plurality of ports while controlling the intensity of each optical signal.

The pre-optical amplifying unit 8 and the post-optical amplifying unit 10 amplify the input optical signal. Similarly, the pre-optical amplifying unit (not illustrated) and the post-optical amplifying unit (not illustrated) of the first optical add-drop multiplexer 2a also amplify the optical signal. Similarly, the pre-optical amplifying unit (not illustrated) and the post-optical amplifying unit (not illustrated) of the second optical add-drop multiplexer 2b also amplify the optical signal.

The demultiplexing unit 12 outputs a plurality of input optical signals from a plurality of ports. The same applies to the demultiplexing units of the first optical add-drop multiplexer 2a and the second optical add-drop multiplexer 2b. The plurality of third multiplexing units 14, the first multiplexing unit 14a, and the second multiplexing unit 14b multiplex input optical signals and output the multiplexed optical signals.

The control unit 16 controls the dropping unit 6 and the adding unit 4. Similarly, the control unit (not illustrated) of the first optical add-drop multiplexer 2a controls the dropping unit 6a and the adding unit 4a of the first optical add-drop multiplexer 2a. Similarly, the control unit (not illustrated) of the second optical add-drop multiplexer 2b controls the dropping unit 6b and the adding unit 4b of the second optical add-drop multiplexer 2b.

The first optical add-drop multiplexer 2a and the second optical add-drop multiplexer 2b are, for example, devices that have substantially the same structure as the structure of the optical add-drop multiplexer 2. Details of the hardware configuration of the optical add-drop multiplexer 2 and the like will be described in a second embodiment.

In the example illustrated in FIG. 1, the first optical add-drop multiplexer 2a and the second optical add-drop multiplexer 2b are directly connected through an optical line 124. However, the first optical add-drop multiplexer 2a and the second optical add-drop multiplexer 2b may be connected via another optical add-drop multiplexer. The same applies to the second optical add-drop multiplexer 2b and the optical add-drop multiplexer 2. Moreover, places in the order of arranging the first optical add-drop multiplexer 2a and the second optical add-drop multiplexer 2b may be interchanged. Alternatively, the first optical add-drop multiplexer 2a and the second optical add-drop multiplexer 2b may be one and the same device.

(2) Operation

Figure 2:
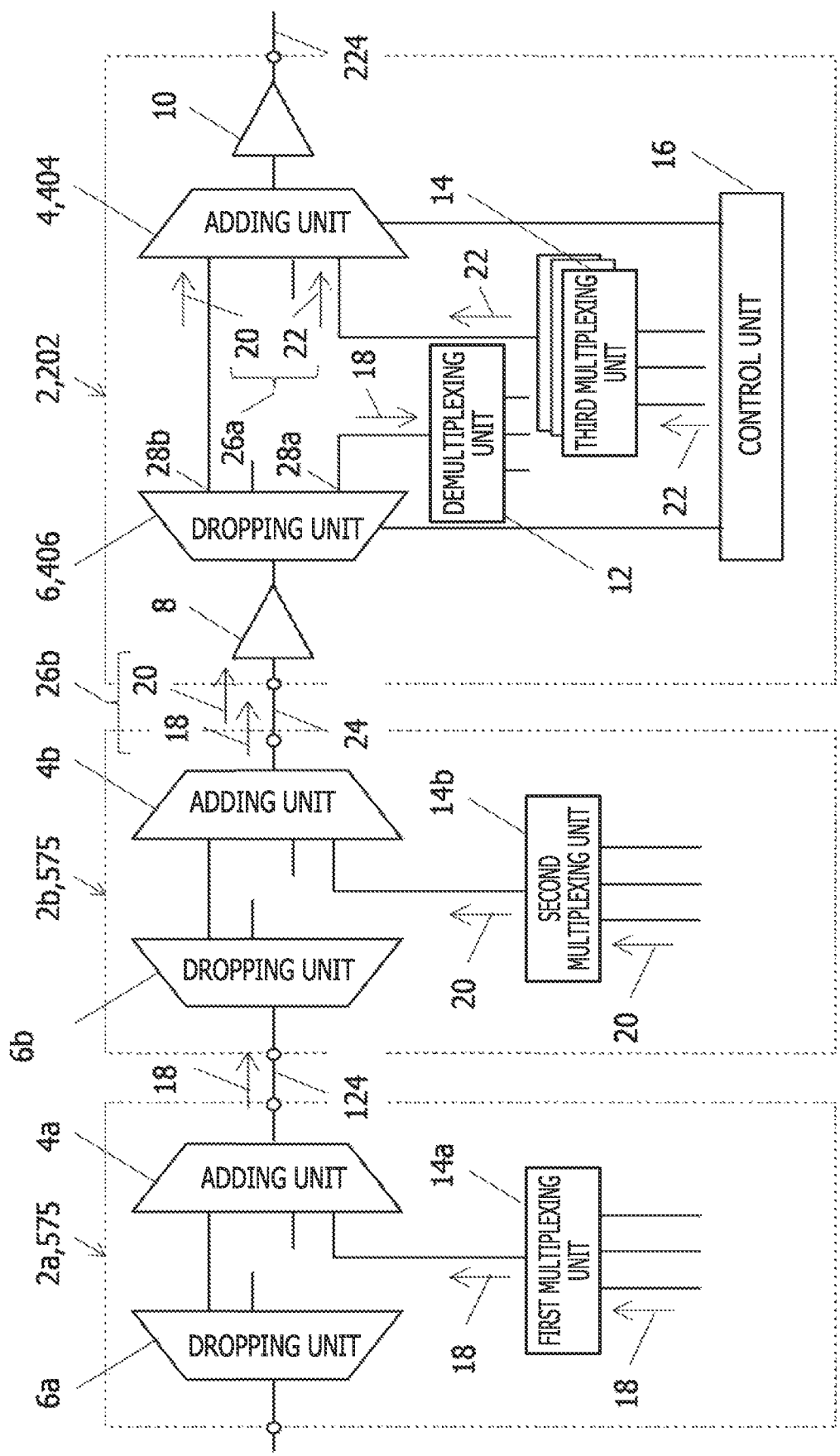
FIG. 2 is a diagram for explaining the operation of the optical add-drop multiplexer 2.

FIG. 2 is a diagram for explaining the operation of the optical add-drop multiplexer 2.

—Operation of First to Third Multiplexing Units—

The first multiplexing unit 14a of the first optical add-drop multiplexer 2a and the second multiplexing unit 14b of the second optical add-drop multiplexer 2b, for example, multiplex (which means to multiplex in wavelength) a plurality of optical signals that have different wavelengths from each other and are generated by a plurality of transmitters. Similarly, the plurality of third multiplexing units 14 of the optical add-drop multiplexer 2, for example, multiplex (which means to multiplex in wavelength) a plurality of optical signals that have different wavelengths from each other and are generated by a plurality of transmitters.

—Drop Signal 18, Through Signal 20, Add Signal 22—

First, an optical signal that passes through the first multiplexing unit 14a (hereinafter referred to as a drop signal 18), an optical signal that passes through the second multiplexing unit 14b (hereinafter referred to as a through signal 20), and an optical signal that passes through the third multiplexing unit 14 (hereinafter referred to as an add signal 22) will be described.

In the example illustrated in FIG. 1, the first optical add-drop multiplexer 2a outputs the drop signal 18, and the second optical add-drop multiplexer 2b outputs the through signal 20. The second optical add-drop multiplexer 2b further allows all or part of light that has entered from the optical line 124 (here, the drop signal 18) to pass through. The drop signal 18 and the through signal 20 are input to the optical add-drop multiplexer 2 from an optical line 24.

The drop signal 18, the through signal 20, and the add signal 22 are optical signals having different wavelengths from each other generated by distinct transmitters. This means that the through signal 20 is a signal different from the drop signal 18. The add signal 22 is a signal different from the drop signal 18 and the through signal 20.

In the example illustrated in FIG. 1, the drop signal 18 is multiplexed with another optical signal when passing through the first multiplexing unit 14a, and is sent out to the optical line 124 (for example, an optical fiber) via the adding unit 4a. The drop signal 18 is further sent out to the optical line 24 (for example, an optical fiber) via the second optical add-drop multiplexer 2b. The through signal 20 is multiplexed with another optical signal when passing through the second multiplexing unit 14b, and is sent out to the optical line 24 via the adding unit 4b.

Each of a plurality of the add signals 22 is multiplexed with another add signal when passing through one of the plurality of third multiplexing units 14. The optical add-drop multiplexer 2 inputs (which means to send out) the plurality of add signals 22 and the through signal 20 to another optical line 224 different from the optical line 24.

All or some of the plurality of third multiplexing units 14 are multiplexing units of different types from each other. The types of the multiplexing units will be described in the second embodiment.

—Operation of Adding Unit 4—

A plurality of first optical signals 26a including the through signal 20 and the plurality of add signals 22 is input to the adding unit 4. While controlling each first optical signal included in the plurality of first optical signals 26a such that the intensity of each first optical signal coincides with a target value (hereinafter referred to as a first output level target value), the adding unit 4 multiplexes the plurality of input first optical signals 26a. The respective first optical signals may be input together or may be input at distinct time points to the adding unit 4.

Here, the through signal 20 is one of the plurality of first optical signals 26a. The add signal 22 is another one of the plurality of first optical signals 26a. The first output level target value is a value set for each optical signal. The plurality of first optical signals 26a contains optical signals having different wavelengths from each other. The same applies to a plurality of second optical signals 26b described later.

—Control for Adding Unit 4—

The control by the control unit 16 uses an intensity change rate ($=I_{out}/I_{in}$) that is a ratio of an intensity $I_{out}$ of light after passing through an optical circuit (for example, an AWG or an MCS) to an intensity $I_{in}$ of that light before passing through that optical circuit. An intensity change rate less than 1 is referred to as loss.

The control unit 16 sets the first output level target value of the through signal 20 for the adding unit 4b according to a second intensity change rate that is the above-mentioned ratio of the intensity of the through signal 20 before and after passing through the second multiplexing unit 14b. The control unit 16 further sets the first output level target value of each optical signal of the plurality of add signals 22 to a value according to a third intensity change rate that is the above-mentioned ratio of the intensity of the each optical signal before and after passing through one of the plurality of third multiplexing units 14.

—Operation of Dropping Unit 6—

A plurality of second optical signals 26b including the drop signal 18 and the through signal 20 is input to the dropping unit 6 from the optical line 24. The dropping unit 6 controls the drop signal 18 and the through signal 20 such that the output level of the input drop signal 18 coincides with the second output level target value and besides the output level of the input through signal 20 coincides with a third output level target value. The respective optical signals included in the plurality of second optical signals may be input together or may be input at distinct time points to the optical add-drop multiplexer 2.

The dropping unit 6 further outputs the drop signal 18 from a first port 28a connected to the demultiplexing unit 12 and outputs the through signal 20 from a second port 28b different from the first port 28a, while controlling the output levels of the drop signal 18 and the through signal 20. The demultiplexing unit 12 is a unit that demultiplexes the multiplexed optical signal.

The plurality of first optical signals 26a input to the adding unit 4 includes the plurality of add signals 22 and the through signal 20 output from the second port 28b.

The drop signal 18 and the through signal 20 are each one of the plurality of second optical signals 26b. The second output level target value is a value set for each optical signal.

—Control for Dropping Unit 6—

The control unit 16 sets the second output level target value of the drop signal 18 (which is the target value of the optical signal output from the first port 28a) to a value according to a fourth intensity change rate that is the above-mentioned intensity change rate and is the above-mentioned ratio of the intensity of the drop signal 18 before and after passing through the demultiplexing unit 12. The control unit 16 further sets the third output level target value of the through signal 20 (which is the target value of the optical signal output from the second port 28b) to a value according to the above-mentioned second intensity change rate.

—Operation of Pre-Optical Amplifying Unit 8—

The pre-optical amplifying unit 8 amplifies the plurality of second optical signals 26b and inputs the plurality of amplified second optical signals 26b to the dropping unit 6.

—Control for Pre-Optical Amplifying Unit 8—

The control unit 16 controls the gain of the pre-optical amplifying unit 8. The gain of the pre-optical amplifying unit 8 is controlled such that the intensity of the second optical signal 26b at the output of the pre-optical amplifying unit 8 coincides with a predetermined target value.

—Operation of Post-Optical Amplifying Unit 10—

The post-optical amplifying unit 10 amplifies the plurality of first optical signals 26a multiplexed by the adding unit 4 and inputs the amplified first optical signals 26a to another optical line 224.

—Control for Post-Optical Amplifying Unit 10—

The control unit 16 controls the gain of the post-optical amplifying unit 10 such that the output levels of the plurality of first optical signals 26a amplified by the post-optical amplifying unit 10 coincide with a value calculated based on the sum of the first output level target values of the respective first optical signals. "Respective first optical signals" are optical signals included in the plurality of first optical signals 26a.

(3) Transition in Intensities of Optical Signals

FIGS. 3 to 11 are diagrams for explaining an example of transition in the intensities of the optical signals transmitted from the first optical add-drop multiplexer 2a toward the third optical add-drop multiplexer (which is the optical add-drop multiplexer 2).

Here, a case where the first optical add-drop multiplexer 2a includes two multiplexing units, and the third optical add-drop multiplexer (which is the optical add-drop multiplexer 2) includes two demultiplexing units (hereinafter referred to as case 1) is considered. Except for these points, the structure and function of each optical add-drop multiplexer in case 1 are substantially the same as the structure and function of the optical add-drop multiplexer 2 described with reference to FIGS. 1 and 2.

FIG. 3 is a table illustrating the multiplexing unit and the demultiplexing unit included in each optical add-drop multiplexer in case 1. The names of optical add-drop multiplexers are illustrated in the first column in FIG. 3. The names of multiplexing units are illustrated in the second column. The names of demultiplexing units are illustrated in the third column. The second row in FIG. 3 indicates that the first optical add-drop multiplexer 2a in case 1 has a multiplexing unit A, a multiplexing unit B, and a demultiplexing unit a. The same applies to the third and fourth rows in FIG. 3.

Figure 4:
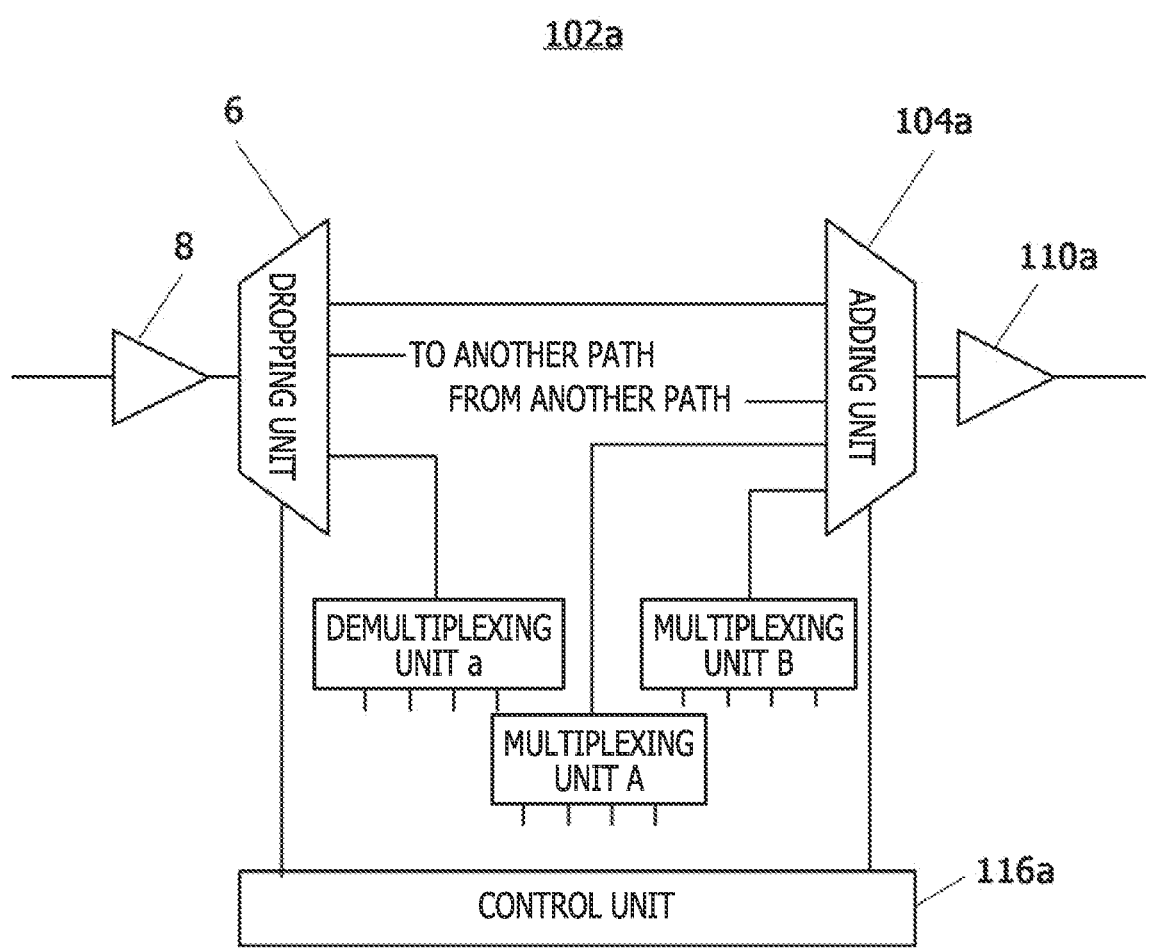
FIG. 4 is a diagram illustrating a functional block diagram of a first optical add-drop multiplexer 102a in case 1.
Figure 5:
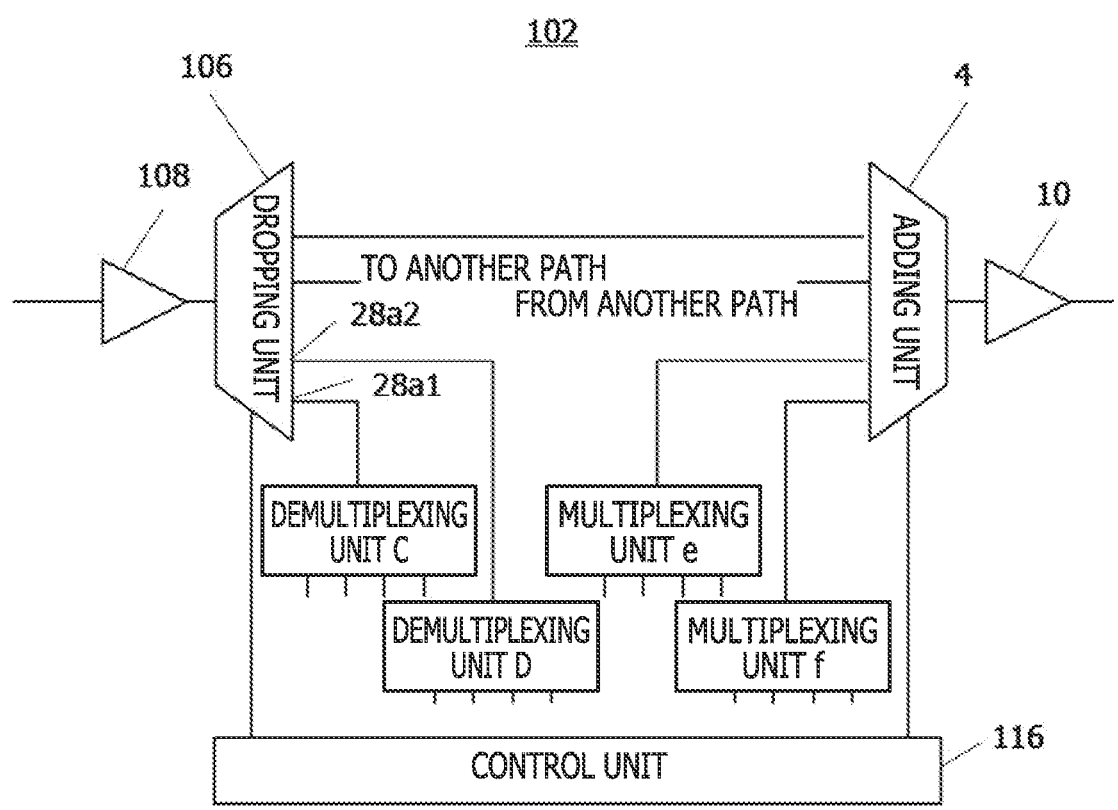
FIG. 5 is a diagram illustrating a functional block diagram of a third optical add-drop multiplexer 102 in case 1.

FIG. 4 is a diagram illustrating a functional block diagram of a first optical add-drop multiplexer 102a in case 1. FIG. 5 is a diagram illustrating a functional block diagram of a third optical add-drop multiplexer 102 in case 1.

As illustrated in FIGS. 3 and 4, the first optical add-drop multiplexer 102a in case 1 (which is an optical add-drop multiplexer on an upstream side) includes the multiplexing unit A, the multiplexing unit B, and the demultiplexing unit a. As illustrated in FIGS. 3 and 5, the third optical add-drop multiplexer 102 in case 1 (which is an optical add-drop multiplexer on a downstream side) includes a multiplexing unit e, a multiplexing unit f, a demultiplexing unit C, and a demultiplexing unit D.

An example of the transition in the intensity of an optical signal that passes through the multiplexing unit A (hereinafter referred to as an optical signal A) and the transition in the intensity of an optical signal that passes through the multiplexing unit B (hereinafter referred to as an optical signal B) will be indicated from here.

FIG. 6 is a table illustrating the types of the optical signals A and B in each optical add-drop multiplexer. The names of optical add-drop multiplexers are illustrated in the first column in FIG. 6. The types of the optical signal A in each optical add-drop multiplexer are illustrated in the second column. The types of the optical signal B in each optical add-drop multiplexer are illustrated in the third column. The second row in FIG. 6 indicates that the types of the optical signals A and B in the first optical add-drop multiplexer 102a are the add signals. The same applies to the third and fourth rows in FIG. 6.

FIG. 7 is a diagram illustrating the types of the multiplexing units A and B in each optical add-drop multiplexer. The names of optical add-drop multiplexers are illustrated in the first column in FIG. 7. The types of the multiplexing unit A in each optical add-drop multiplexer are illustrated in the second column. The types of the multiplexing unit B in each optical add-drop multiplexer are illustrated in the third column.

FIG. 8 is a table illustrating an example of the intensity change rates of the multiplexing units A and B. FIG. 9 is a diagram illustrating an example of the intensity change rates of the demultiplexing units C and D. The multiplexing unit A and the demultiplexing unit C are, for example, contentionless M×N WSSs. The multiplexing unit B and the demultiplexing unit D are, for example, M×N multicast switches (MCSs).

FIG. 10 is a table illustrating an example of transition in the intensity of the optical signal A and the intensity of the optical signal B. The names of optical add-drop multiplexers are illustrated in the first column in FIG. 10. The order in which the optical signals A and B pass through respective units illustrated in the third column (hereinafter referred to as a passing order) is illustrated in the second column. The types of units (for example, a transmitter) through which the optical signals A and B pass are illustrated in the third column. Transition in the output level of the optical signal A across the units is indicated in the fourth column. Transition in the output level of the optical signal B across the units is indicated in the fifth column. The second row in FIG. 10 indicates that the intensity of the optical signal A output from a transmitter is 0 dBm, and the intensity of the optical signal B output from another transmitter is 0 dBm. The same applies to the third to fourteenth rows in FIG. 10. Note that, in case 1, the optical signals A and B are output from distinct transmitters and pass through distinct multiplexing units and distinct demultiplexing units.

Figure 11:
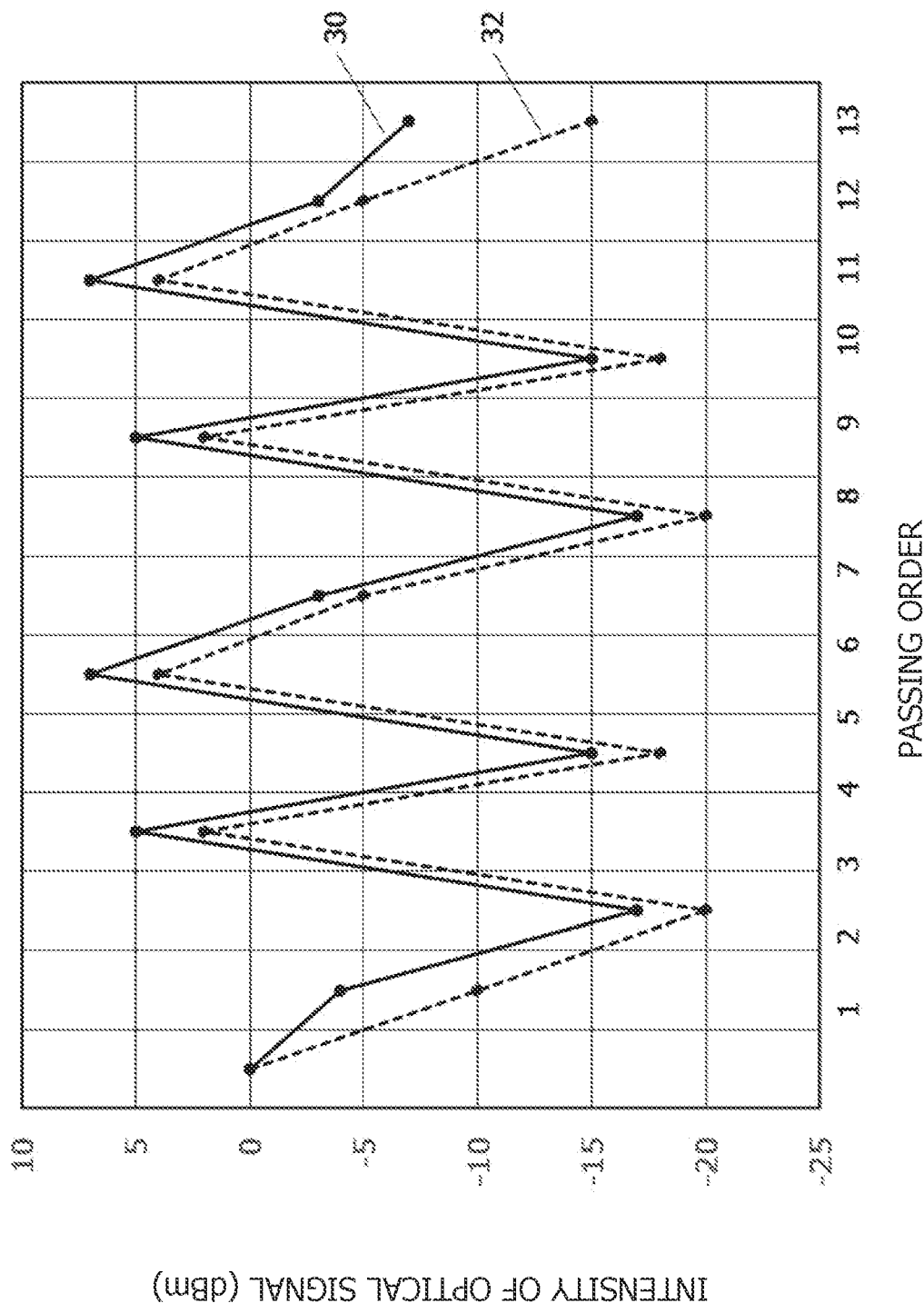
FIG. 11 is a graph illustrating transition in the intensities of the optical signals A and B.

FIG. 11 is a graph illustrating transition in the intensities of the optical signals A and B. The vertical axis denotes the intensity of the optical signal. The horizontal axis denotes the passing order. A solid line 30 indicates the transition in the intensity of the optical signal A. A broken line 32 indicates the transition in the intensity of the optical signal B.

—Output Intensity of Optical Transmitter (Passing Order 1)—

The intensities of the optical signals A and B output from an optical transmitter before being input to a multiplexing unit is 0 dBm (refer to the passing order 1 in FIGS. 10 and 11).

—Output Intensity of Multiplexing Unit (Passing Order 2)—

The intensity change rate of the multiplexing unit A is −4 dB, and the intensity change rate of the multiplexing unit B is −10 dB (refer to FIG. 8). Therefore, the intensity of the optical signal A output from the multiplexing unit A before being input to an adding unit 104*a* (refer to FIG. 4) is −4 dBm, and the intensity of the optical signal B output from the multiplexing unit B before being input to the adding unit 104*a* is −10 dBm.

—Output Intensity of Adding Unit 104*a* (Passing Order 3)—

As described above, the types of the optical signals A and B in the first optical add-drop multiplexer 102*a* are the add signals (refer to FIG. 6). The types of the multiplexing units A and B in the first optical add-drop multiplexer 102*a* are the third multiplexing units (which are the multiplexing units that multiplex the add signal) (refer to FIG. 7).

The optical signal A output from the multiplexing unit A and the optical signal B output from the multiplexing unit B are input to the adding unit 104*a* (refer to FIG. 4) at the passing order 3. Then, the adding unit 104*a* at the passing order 3 controls the optical signal A such that the intensity of the optical signal A coincides with the first output level target value (here, −17 dBm). The adding unit 104*a* at the passing order 3 further controls the optical signal B such that the intensity of the optical signal B coincides with the first output level target value (here, −20 dBm). The adding unit 104*a* at the passing order 3 further multiplexes the optical signals A and B while controlling the optical signals A and B.

A control unit 116*a* (refer to FIG. 4) presets the first output level target value in the adding unit 104*a* with a value according to the intensity change rate of the multiplexing unit through which the optical signal passes. In case 1, the intensity change rate (−4 dB) of the multiplexing unit A through which the optical signal A passes is higher than the intensity change rate (−10 dB) of the multiplexing unit B through which the optical signal B passes (refer to FIG. 8). Therefore, the first output level target value (here, −17 dBm) of the optical signal A preset in the adding unit 104*a* by the control unit 116*a* is greater than the first output level target value (here, −20 dBm) of the optical signal B preset in the adding unit 104*a* by the control unit 116*a*. The first output level target value is increased according to an increase in the intensity change rate (here, the third intensity change rate) of the multiplexing unit through which the optical signal passes.

The intensity of the optical signal A output from the adding unit 104*a* at the passing order 3 before being input to a post-optical amplifying unit 110*a* obtains the same value (−17 dBm) as the first output level target value of the optical signal A. The intensity of the optical signal B output from the adding unit 104*a* at the passing order 3 before being input to the post-optical amplifying unit 110*a* obtains the same value (−20 dBm) as the first output level target value of the optical signal B.

—Output Intensity of Post-Optical Amplifying Unit 110*a* (Passing Order 4)—

The post-optical amplifying unit 110*a* (refer to FIG. 4) at the passing order 4 amplifies the optical signals A and B multiplexed by the adding unit 104*a* and inputs the amplified optical signals A and B to an optical line at the passing order 5.

In case 1, a case where optical signals other than the optical signals A and B are not input to the adding unit 104*a* (refer to FIG. 4) at the passing order 3 is considered.

The table illustrated in FIG. 34 is also stored in an optical circuit type/output level correspondence table storage unit in FIG. 18 (refer to the second embodiment).

FIG. 34 depicts a table that stores output level target values with respect to optical circuit type information on ADD units of the pre-optical amplifying unit and the post-optical amplifying unit. The output level target value is a value according to the magnitude of the intensity change rate of the optical circuit of the ADD unit, and in the case of an optical circuit with a smaller intensity change rate, the output level target value is set higher accordingly.

An amplifier average output level target value setting unit in FIG. 18 acquires the information in FIG. 34 from the optical circuit type/output level correspondence table storage unit. Furthermore, the optical circuit type information is acquired from an optical circuit type information management unit in FIG. 18. The amplifier average output level target value setting unit in FIG. 18 determines the output level of each signal wavelength on the basis of the optical circuit type information for each signal wavelength. Moreover, an average output level [dBm/ch] of all used signal wavelengths is calculated. The gain of an optical amplifier is controlled such that the gain coincides with that value.

Figure 33:
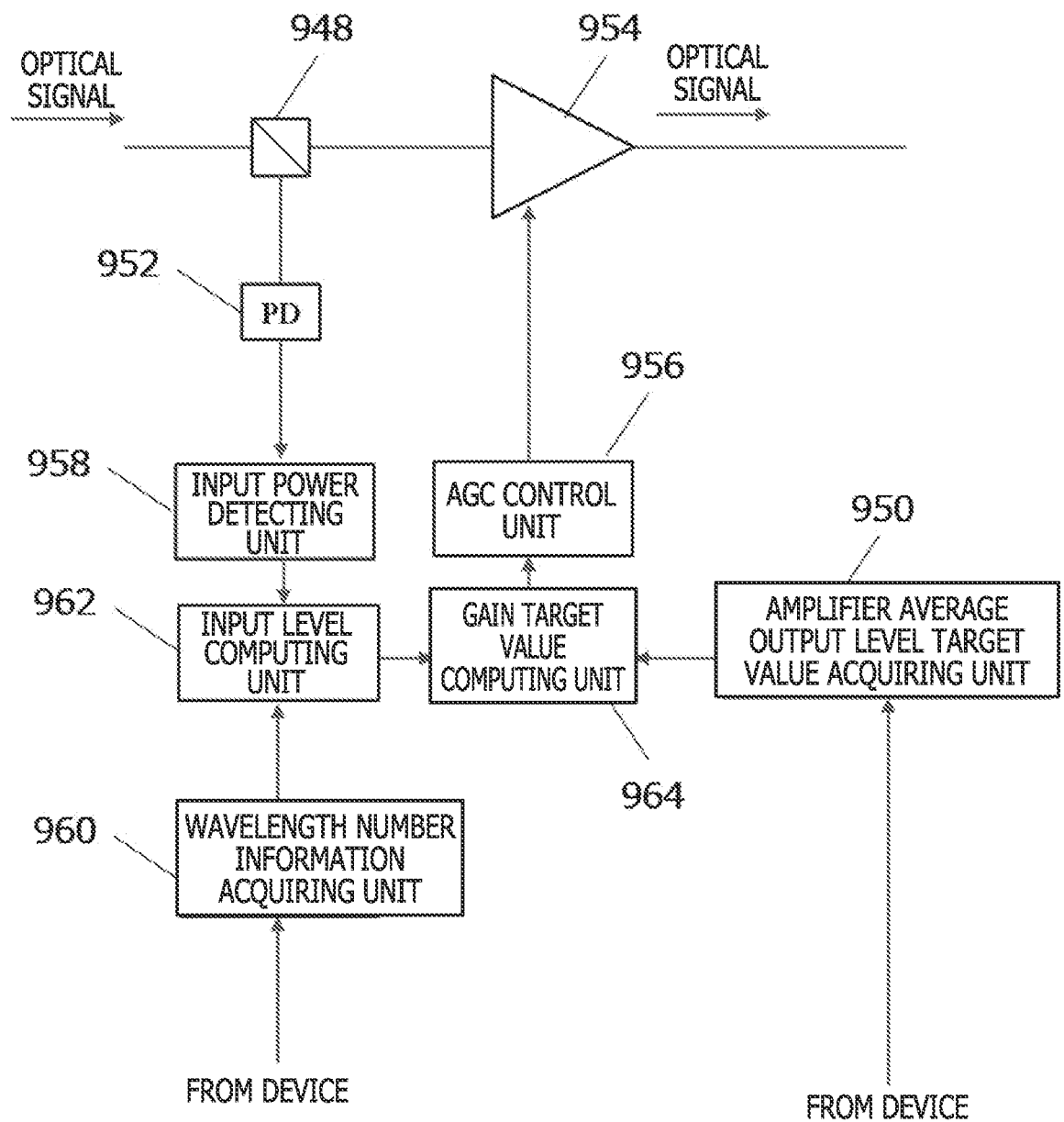
FIG. 33 is a diagram illustrating a gain control method for an optical amplifier.

FIG. 33 illustrates a gain control method for the optical amplifier. The input power is detected by a photodetector (PD) at the input of the amplifier. Furthermore, wavelength number information is acquired from the device. An average input level dBm/ch is calculated from the input power and the wavelength number information. In addition, an amplifier average output level target value is acquired from the device, and a gain target value is computed from the input level and the output level. An automatic gain control (AGC) control unit controls an amplifying unit such that the amplifying unit has the target gain.

—Output Intensity of Optical Line (Passing Order 5)—

The optical signals A and B are attenuated while propagating through the optical line at the passing order 5. In case 1, the loss due to the optical line at the passing order 5 is −22 dB. Therefore, the intensity of the optical signal A output from the optical line at the passing order 5 is −15 dBm, and the intensity of the optical signal B output from the optical line at the passing order 5 is −18 dBm.

The optical signals A and B are output from the optical line at the passing order 5, and are input to a second optical add-drop multiplexer (not illustrated) sandwiched between the first optical add-drop multiplexer 102*a* and the third optical add-drop multiplexer 102.

—Output Intensity of Pre-Optical Amplifying Unit (Passing Order 6)—

A pre-optical amplifying unit (not illustrated) at the passing order 6 amplifies a plurality of second optical signals that includes the optical signals A and B and has been input from the optical line at the passing order 5, and inputs the plurality of amplified second optical signals to a dropping unit (not illustrated) at the passing order 7. The plurality of second optical signals in case 1 includes only the optical signals A and B.

The table illustrated in FIG. 34 is also stored in the optical circuit type/output level correspondence table storage unit in FIG. 18 (refer to the second embodiment).

FIG. 34 depicts a table that stores output level target values with respect to optical circuit type information on ADD units of the pre-optical amplifying unit and the post-optical amplifying unit. The output level target value is a value according to the magnitude of the intensity change rate of the optical circuit of the ADD unit, and in the case of an optical circuit with a smaller intensity change rate, the output level target value is set higher accordingly.

The amplifier average output level target value setting unit in FIG. 18 acquires the information in FIG. 34 from the optical circuit type/output level correspondence table storage unit. Furthermore, the optical circuit type information is acquired from the optical circuit type information management unit in FIG. 18. The amplifier average output level target value setting unit in FIG. 18 determines the output level of each signal wavelength on the basis of the optical circuit type information for each signal wavelength. Moreover, an average output level [dBm/ch] of all used signal wavelengths is calculated. The gain of an optical amplifier is controlled such that the gain coincides with that value.

FIG. 33 illustrates a gain control method for the optical amplifier. The input power is detected by a photodetector (PD) at the input of the amplifier. Furthermore, wavelength number information is acquired from the device. An average input level dBm/ch is calculated from the input power and the wavelength number information. In addition, an amplifier average output level target value is acquired from the device, and a gain target value is computed from the input level and the output level. The AGC control unit controls an amplifying unit such that the amplifying unit has the target gain.

—Output Intensity of Dropping Unit (Passing Order 7)—

As described above, the types of the optical signals A and B in the second optical add-drop multiplexer are the through signals (refer to FIG. 6). The types in the second optical add-drop multiplexer of the multiplexing units A and B arranged in the first optical add-drop multiplexer 102*a* are the second multiplexing units (which are the multiplexing units that multiplex the through signal) (refer to FIG. 7).

The optical signals A and B output from the pre-optical amplifying unit at the passing order 6 are input to the dropping unit (not illustrated) at the passing order 7. Then, the dropping unit at the passing order 7 controls the optical signal A such that the intensity of the optical signal A coincides with the third output level target value (here, −3 dBm). The dropping unit at the passing order 7 further controls the optical signal B such that the intensity of the optical signal B coincides with the third output level target value (here, −5 dBm). The dropping unit at the passing order 7 outputs the optical signals A and B whose intensities have been controlled, while controlling the optical signal A and controlling the optical signal B.

A control unit of the second optical add-drop multiplexer (not illustrated) presets the third output level target value to a value according to the intensity change rate of the multiplexing unit through which the optical signal passes. In case 1, the intensity change rate (−4 dB) of the multiplexing unit A through which the optical signal A passes is higher than the intensity change rate (−10 dB) of the multiplexing unit B through which the optical signal B passes. Therefore, the third output level target value (here, −3 dBm) of the optical signal A preset in the dropping unit at the passing order 7 by the control unit of the second optical add-drop multiplexer is greater than the third output level target value (here, −5 dBm) of the optical signal B preset in the adding unit 104*a* by the control unit 116*a*. The third output level target value is increased according to an increase in the intensity change rate (here, the second intensity change rate) of the multiplexing unit through which the optical signal passes.

The intensity of the optical signal A when input to the adding unit at the passing order 8 after being output from the dropping unit at the passing order 7 obtains the same value (−3 dBm) as the third output level target value of the optical signal A. The intensity of the optical signal B when input to the adding unit at the passing order 8 after being output from the dropping unit at the passing order 7 obtains the same value (−5 dBm) as the third output level target value of the optical signal B.

—Output Intensity of Adding Unit (Passing Order 8)—

The optical signals A and B output from the dropping unit at the passing order 7 are input to the adding unit (not illustrated) at the passing order 8. The adding unit at the passing order 8 further controls the optical signal A such that the intensity coincides with the first output level target value (here, −17 dBm). The adding unit at the passing order 8 further controls the optical signal B such that the intensity coincides with the first output level target value (here, −20 dBm). The adding unit at the passing order 8 further multiplexes the optical signal A whose intensity has been controlled and the optical signal B whose intensity has been controlled, while controlling the optical signal A and controlling the optical signal B.

The value of the first output level target value of the optical signal A set in the adding unit at the passing order 8 is set to a value according to the intensity change rate (here, −4 dB) of the optical signal A that passes through the multiplexing unit A. The value of the first output level target value of the optical signal B set in the adding unit at the passing order 8 is set to a value according to the intensity change rate (here, −10 dB) of the optical signal B that passes through the multiplexing unit B.

The first output level target value of the optical signal A set in the adding unit at the passing order 8 has the same value as the first output level target value of the optical signal A set in the adding unit at the passing order 3. The first output level target value of the optical signal B set in the adding unit at the passing order 8 has the same value as the value of the first output level target value of the optical signal B set in the adding unit 104*a* at the passing order 3.

—Output Intensity of Post-Optical Amplifying Unit (Passing Order 9)—

The post-optical amplifying unit at the passing order 9 amplifies the optical signals A and B multiplexed by the adding unit at the passing order 8 and inputs the amplified optical signals A and B to the optical line 24. The post-optical amplifying unit at the passing order 9 determines an amplification factor by a procedure similar to the procedure of the post-optical amplifying unit at the passing order 4.

—Output Intensity of Optical Line (Passing Order 10)—

The optical signals A and B are attenuated while propagating through the optical line at the passing order 10. In case 1, the loss due to the optical line at the passing order 10 is −20 dB. Therefore, the intensity of the optical signal A output from the optical line at the passing order 10 is −15 dBm, and the intensity of the optical signal B output from the optical line at the passing order 10 is −18 dBm.

The optical signals A and B are output from the optical line at the passing order 10 and input to the third optical add-drop multiplexer 102 (refer to FIG. 5).

—Output Intensity of Pre-Optical Amplifying Unit (Passing Order 11)—

The pre-optical amplifying unit 108 at the passing order 11 amplifies the plurality of second optical signals that includes the optical signals A and B and has been input from the optical line at the passing order 10, and inputs the plurality of amplified second optical signals to the dropping unit 106 at the passing order 12. The pre-optical amplifying unit at the passing order 11 determines an amplification factor by a procedure similar to the procedure of the pre-optical amplifying unit at the passing order 6.

—Output Intensity of Dropping Unit (Passing Order 12)—

As described above, the types of the optical signals A and B in the third optical add-drop multiplexer 102 are the drop signals (refer to FIG. 6). The types in the third optical add-drop multiplexer 102 of the multiplexing units A and B arranged in the first optical add-drop multiplexer 102*a* are the first multiplexing units (which are the multiplexing units that multiplex the drop signal) (refer to FIG. 7).

The optical signals A and B output from the pre-optical amplifying unit 108 at the passing order 11 are input to the dropping unit 106 at the passing order 12. Then, the dropping unit 106 at the passing order 12 controls the optical signal A such that the intensity coincides with the second output level target value (here, −3 dBm), and further controls the optical signal B such that the intensity coincides with the second output level target value (here, −5 dBm). The dropping unit 106 at the passing order 12 outputs the optical signal A whose intensity has been controlled so as to coincide with the second output level target value (here, −3 dBm), from a first port 28*a*1 to which the demultiplexing unit C is connected, while controlling the optical signal A and controlling the optical signal B. The dropping unit 106 at the passing order 12 further outputs the optical signal B whose intensity has been controlled so as to coincide with the second output level target value (here, −5 dBm), from another second port 28*a*2 connected to the demultiplexing unit D.

Therefore, the intensity of the optical signal A when input to the demultiplexing unit C after being output from the dropping unit 106 at the passing order 12 is −3 dBm, and the intensity of the optical signal B when input to the demultiplexing unit D after being output from the dropping unit 106 at the passing order 12 is −5 dBm.

The control unit 116 of the third optical add-drop multiplexer 102 presets the second output level target value to a value according to the intensity change rate (here, the fourth intensity change rate) of the demultiplexing unit through which the optical signal passes. In case 1, the intensity change rate (−4 dB) of the demultiplexing unit C through which the optical signal A passes is higher than the intensity change rate (−10 dB) of the demultiplexing unit D through which the optical signal B passes (refer to FIG. 9). Therefore, the second output level target value (here, −3 dBm) of the optical signal A preset in the dropping unit 106 at the passing order 12 by the control unit 116 is greater than the second output level target value (here, −5 dBm) of the optical signal B preset in the dropping unit 106 at the passing order 12 by the control unit 116. The second output level target value increases as the fourth intensity change rate increases.

The intensity of the optical signal A when input to the demultiplexing unit C after being output from the dropping unit 106 at the passing order 12 obtains the same value (−3 dBm) as the second output level target value of the optical signal A. The intensity of the optical signal B when input to the demultiplexing unit D after being output from the dropping unit 106 at the passing order 12 obtains the same value (−5 dBm) as the second output level target value of the optical signal B.

—Output Intensity of Demultiplexing Unit (Passing Order 13)—

The intensity change rate of the demultiplexing unit C is −4 dB, and the intensity change rate of the demultiplexing unit D is −10 dB (refer to FIG. 9). Therefore, the intensity of the optical signal A output from the demultiplexing unit C is given as −7 dBm, and the intensity of the optical signal B output from the demultiplexing unit D is given as −15 dBm.

(4) When Target Value is Set Uniformly

As illustrated in FIGS. 10 and 11, in the first embodiment, the optical signal output from the optical transmitter is controlled such that the intensity when first amplified by the optical amplifier coincides with the target value (which is the first output level target value) according to the intensity change rate (which is the third intensity change rate) of the multiplexing unit through which the optical signal has passed.

Figure 13:
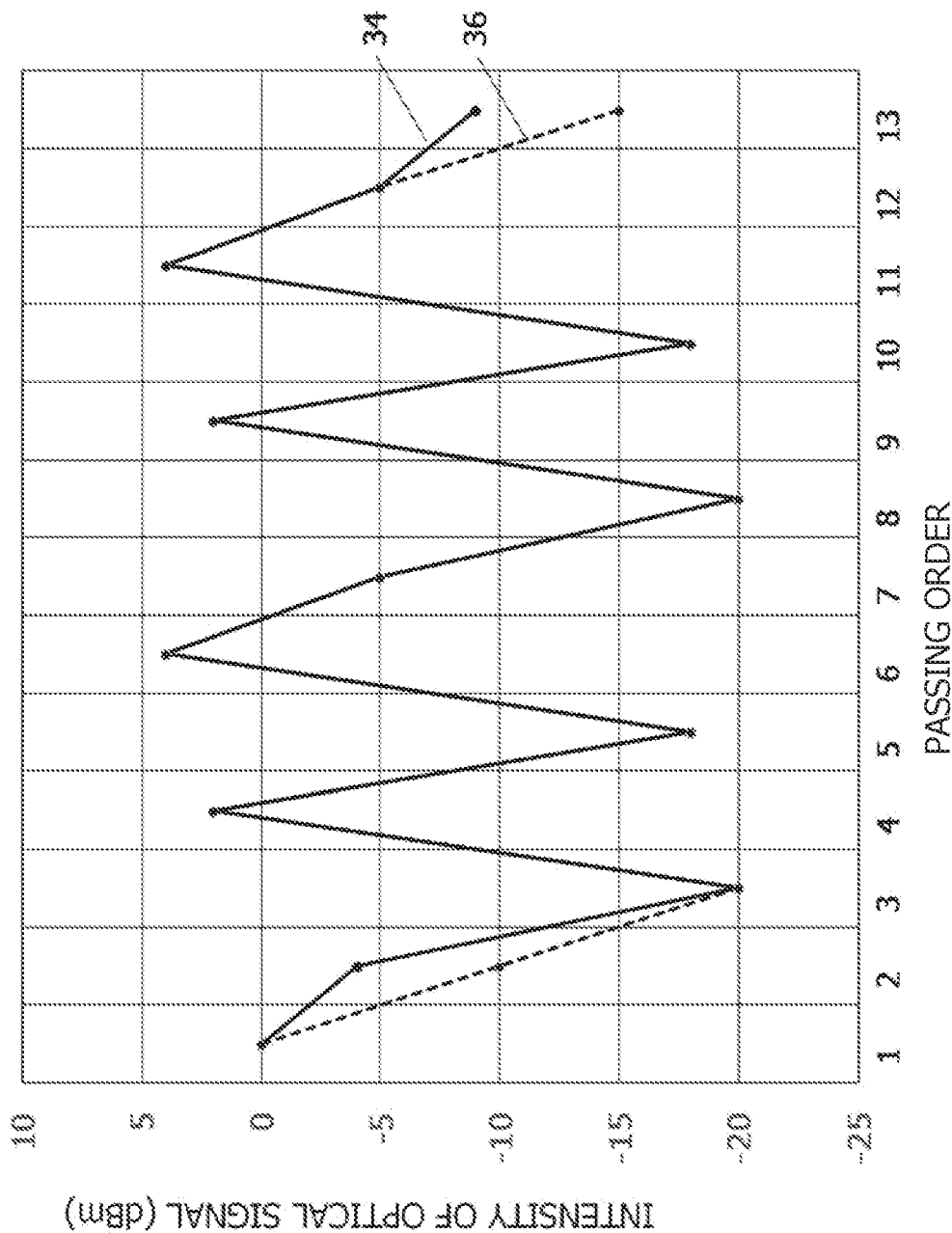
FIG. 13 is a graph illustrating transition in the intensities of the optical signals A and B illustrated in FIG. 12.

FIG. 12 is a table illustrating an example of transition in the intensity of the optical signal when the first output level target value is set uniformly, regardless of the intensity change rate of the multiplexing unit through which the optical signal passes. The item illustrated in each column in FIG. 12 is the same as the item illustrated in each column in FIG. 10. FIG. 13 is a graph illustrating transition in the intensities of the optical signals A and B illustrated in FIG. 12. The vertical axis and the horizontal axis in FIG. 13 are the same as the vertical axis and the horizontal axis in FIG. 11. A solid line 34 indicates the transition in the intensity of the optical signal A. A broken line 36 indicates the transition in the intensity of the optical signal B.

In the examples illustrated in FIGS. 12 and 13, the optical signal output from the transmitter at the passing order 1 is attenuated to a certain intensity by the adding unit 104a at the passing order 3 (refer to FIG. 4), and then is input to the post-optical amplifying unit 110a at the passing order 4. For example, a strongest optical signal A is attenuated to the same intensity (−20 dBm) as the intensity of a weakest optical signal B by the adding unit 104a at the passing order 3, and then is input to the post-optical amplifying unit 110a at the passing order 4.

As a result, the optical signal-to-noise ratio of the optical signal A when output from the post-optical amplifying unit 110a at the passing order 4 obtains a low value that is almost the same as the optical signal-to-noise ratio of the optical signal B when output from the post-optical amplifying unit 110a at the passing order 4.

On the other hand, in the examples illustrated in FIGS. 10 and 11, a strongest optical signal A is attenuated by the adding unit 104a at the passing order 3 to a relatively strong intensity (−17 dBm) according to a small loss of the multiplexing unit A, and then is input to the post-optical amplifying unit 110a at the passing order 4. Therefore, in the examples illustrated in FIGS. 10 and 11, the optical signal-to-noise ratio of the optical signal A when output from the post-optical amplifying unit 110a at the passing order 4 obtains a higher value than the optical signal-to-noise ratio according to the examples illustrated in FIGS. 12 and 13.

In the examples illustrated in FIGS. 10 and 11, the optical signal A is kept stronger than the optical signal B even after being output from the post-optical amplifying unit 110a at the passing order 4 until the optical signal A is input to the dropping unit 106 at the passing order 12 (refer to FIG. 11). Therefore, the optical signal A enters the demultiplexing unit at the passing order 13 while the optical signal-to-noise ratio is kept high. This is because the control target values in the adding unit and the dropping unit through which the optical signal A passes are set to high values according to a small loss of the multiplexing unit A through which the optical signal A passes.

As described above, according to the first embodiment, since the intensity of the optical signal is controlled according to the loss of the optical circuit (here, the multiplexing unit) through which the optical signal first passes, the excessive attenuation of the optical signal is suppressed, and the optical signal-to-noise ratio of the optical signal that passes through an optical circuit with a small loss is improved.

In the example illustrated in FIG. 1 and other drawings, the optical add-drop multiplexer (which is the optical add-drop multiplexer 2 or the like) includes a multiplexing unit (which is the third multiplexing unit 14 or the like) and a demultiplexing unit (which is the demultiplexing unit 12 or the like). However, the optical add-drop multiplexer may not include the multiplexing unit and the demultiplexing unit. In this case, the multiplexing unit and the demultiplexing unit are provided outside the optical add-drop multiplexer. For example, the multiplexing unit may be formed on a blade and detachably attached to the optical add-drop multiplexer. The same applies to the demultiplexing unit.

Second Embodiment

An optical add-drop multiplexer according to the second embodiment resembles the optical add-drop multiplexer 2 according to the first embodiment. Therefore, the description of the same portions and the like as those in the first embodiment will be omitted or simplified.

(1) CONFIGURATION (1-1) Hardware Configuration

Figure 14:
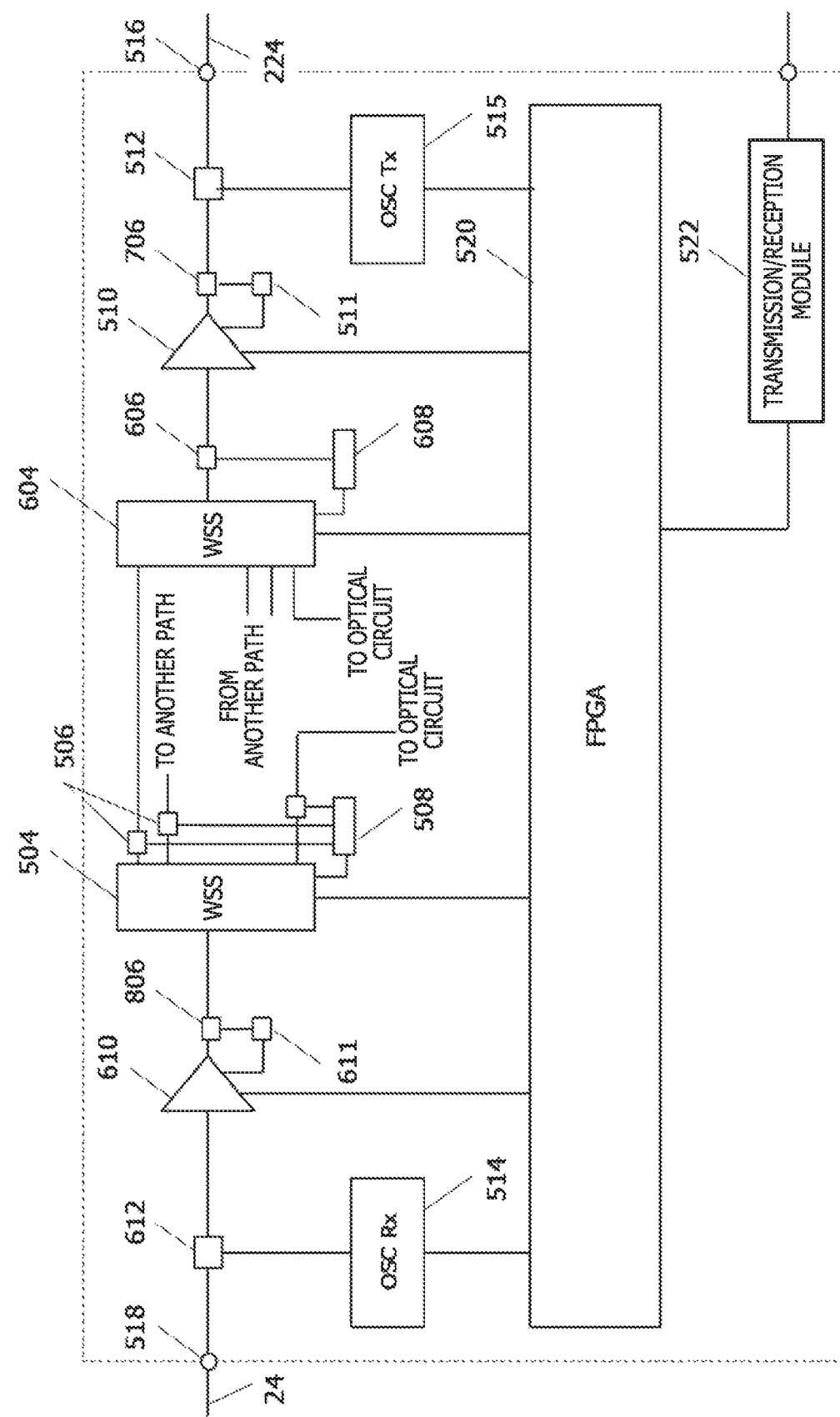
FIG. 14 is a diagram illustrating an example of the hardware configuration of an optical add-drop multiplexer 202 according to a second embodiment.

FIG. 14 is a diagram illustrating an example of the hardware configuration of an optical add-drop multiplexer 202 according to the second embodiment. The optical add-drop multiplexer 202 includes an input-side WSS 504 (hereinafter, referred to as a pre-WSS) and an output-side WSS 604 (hereinafter referred to as a post-WSS).

The optical add-drop multiplexer 202 further includes a plurality of demultiplexers 506 connected to respective output ports of the pre-WSS 504 in a one-to-one correspondence, and an optical channel monitor (OCM) 508 connected to the plurality of demultiplexers 506.

The demultiplexer 506 is an optical device that splits one optical signal into two. The demultiplexer 506 is, for example, a coupler. The same applies to demultiplexers 606, 706, and 806 described later.

One of the optical signals split by the demultiplexer 506 is input to the OCM 508, and the other is input to one of a plurality of input ports of the post-WSS 604 or an optical circuit described later. This optical circuit is used as the demultiplexing unit 12 (refer to FIG. 1) described in the first embodiment. The other of the split optical signals may be sent out to another path. The OCM 508 measures the intensity of each input optical signal and transmits the result of the measurement to the pre-WSS 504.

The output port of the pre-WSS 504 is connected to one of the input ports of the post-WSS 604 via the demultiplexer 506, and the other of the optical signals split by the demultiplexer 506 mentioned above is input to the one of the input ports. An optical circuit different from the above-mentioned optical circuit is connected to another input port of the post-WSS 604. This optical circuit is used as the third multiplexing unit 14 (refer to FIG. 1) described in the first embodiment. Another path may be connected to an input port that is not connected to either the pre-WSS 504 or the optical circuit among the plurality of input ports of the post-WSS 604.

The optical add-drop multiplexer 202 further includes a demultiplexer 606 connected to the output port of the post-WSS 604, and an optical channel monitor (OCM) 608 connected to the demultiplexer 606.

One of the optical signals split by the demultiplexer 606 is input to the OCM 608. The OCM 608 measures the intensity of each input optical signal and transmits the result of the measurement to the post-WSS 604.

The optical add-drop multiplexer 202 further includes an optical amplifier 510 (hereinafter referred to as a post-optical amplifier) connected to the input port of the post-WSS 604 via the demultiplexer 606. The other of the optical signals split by the demultiplexer 606 is input to the post-optical amplifier 510.

The optical add-drop multiplexer 202 further includes a demultiplexer 706 connected to an output port of the post-optical amplifier 510, and a power monitor 511 connected to the demultiplexer 706. The demultiplexer 706 splits each optical signal amplified by the post-optical amplifier 510, and inputs one of every split optical signals to the power monitor 511. The power monitor 511 measures the intensity of the entire input optical signal and transmits the result of the measurement to the post-optical amplifier 510.

The optical add-drop multiplexer 202 further includes an optical multiplexer 512 connected to the post-optical amplifier 510 via the demultiplexer 706, and an optical supervisory channel (OSC) transmitter 515. The optical multiplexer 512 is, for example, a thin film filter. The same applies to an optical demultiplexer 612 described later. The optical multiplexer 512 multiplexes the other of every optical signals split by the demultiplexer 706 and an optical signal output from the OSC transmitter 515 (which is an OSC transfer signal described later), and outputs the multiplexed signal from an output port 516.

The optical add-drop multiplexer 202 further includes the optical demultiplexer 612 connected to an input port 518, and an optical amplifier 610 (hereinafter referred to as a pre-optical amplifier). The optical demultiplexer 612 separates optical signals input from the input port 518 into an optical signal (hereinafter referred to as the OSC transfer signal) used for the management of the optical communication system 5 (refer to FIG. 1) and other optical signals, and transmits the OSC transfer signal to an OSC receiver 514. The optical demultiplexer 612 transmits the optical signals other than the OSC transfer signal among the optical signals input from the input port 518 to the optical amplifier 610.

The optical add-drop multiplexer 202 further includes a demultiplexer 806 connected to an output port of the pre-optical amplifier 610, and a power monitor 611 connected to the demultiplexer 806. The demultiplexer 806 splits each optical signal amplified by the pre-optical amplifier 610, and inputs one of every split optical signals to the power monitor 611. The power monitor 611 measures the intensity of the entire input optical signal and transmits the result of the measurement to the pre-optical amplifier 610. The other of every optical signals split by the demultiplexer 806 is input to the pre-WSS 504.

The optical add-drop multiplexer 202 further includes a field-programmable gate array (FPGA) 520 and a transmission/reception module 522. The FPGA 520 has a memory such as a flash memory. The optical add-drop multiplexer 202 may include a central processing unit (CPU) and a memory instead of the FPGA 520. Alternatively, the optical add-drop multiplexer 202 may have a digital circuit such as an application specific integrated circuit (ASIC) instead of the FPGA 520.

The FPGA 520 is connected to the OSC receiver 514, the OSC transmitter 515, the pre-WSS 504, the post-WSS 604, and the transmission/reception module 522. The FPGA 520 transmits and receives information (which includes data and commands) to and from these devices (which are the OSC receiver 514 and the like) via electrical signals and the like.

The transmission/reception module 522 transmits and receives information to and from a system or a device (hereinafter, referred to as an external system and the like) arranged outside the optical add-drop multiplexer 202. The external system and the like include, for example, an NMS and a user terminal.

—OCM—

The OCM 508 includes a detector module that demultiplexes an optical signal into a plurality of optical signals having different wavelengths from each other and measures the intensity of each demultiplexed optical signal, and a processing circuit that outputs the measurement result in association with the wavelength. The same applies to the OCM 608.

—WSS—

Figure 15:
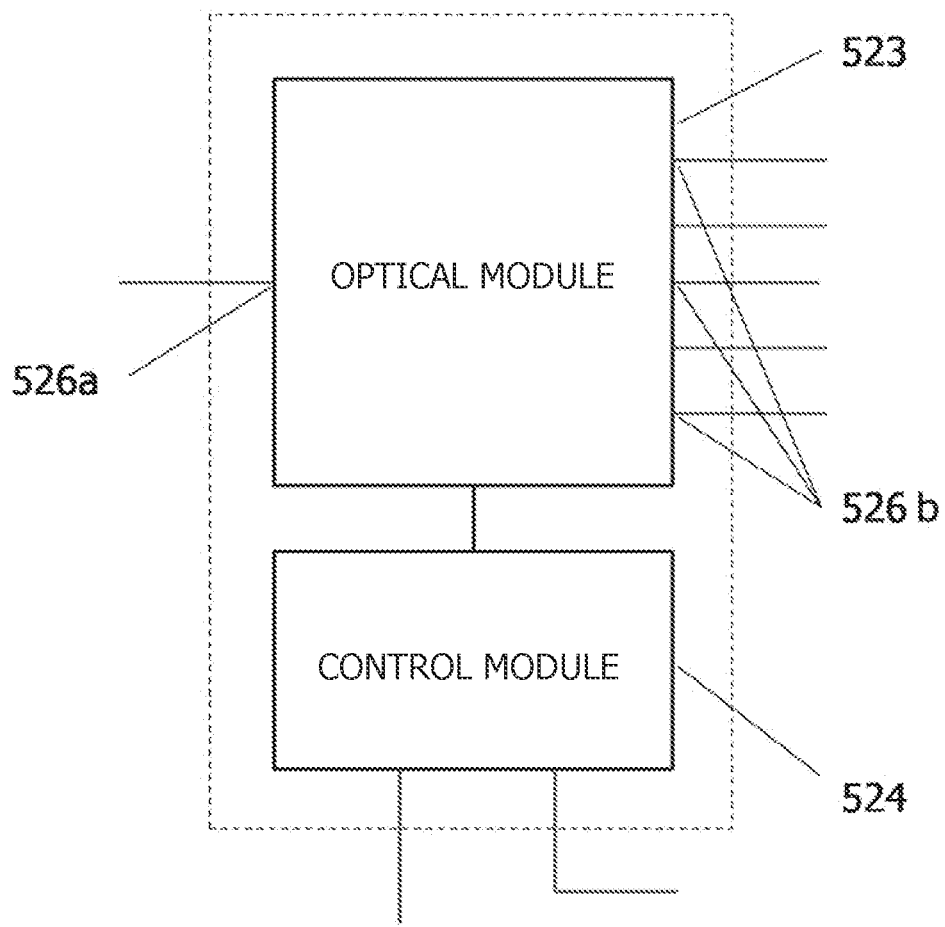
FIG. 15 is a diagram illustrating an example of the structure of a pre-wavelength selective switch (WSS) 504.

FIG. 15 is a diagram illustrating an example of the structure of the pre-WSS 504.

The pre-WSS 504 includes an optical module 523 and a control module 524. The optical module 523 includes, for example, a diffraction grating and a micro electro mechanical systems (MEMS) mirror. The optical module 523 may include liquid crystal on silicon (LCOS) instead of the MEMS mirror.

The optical module 523 selects the optical signal input to a first port 526a according to the wavelength, and attenuates the selected optical signal. The optical module 523 further outputs the selected and attenuated optical signal to one of a plurality of second ports 526b. The first port 526a functions as an input port. The plurality of second ports 526b functions as output ports.

The control module 524 is, for example, an electrical circuit. The control module 524 controls the optical module 523 based on information obtained from the OCM 508.

For example, the control module 524 sets, in the optical module 523, the second port 526b that is the connection destination of the optical signal input from the first port 526a. The control module 524 further controls the optical module 523 based on information from the OCM 508 such that the intensity of the optical signal output from the second port 526b coincides with the target value.

The structure of the post-WSS 604 is substantially the same as the structure of the pre-WSS 504. However, the first port 526a functions as an output port. The plurality of second ports 526b functions as input ports. The optical module 523 selects the optical signal input to the second port 526b according to the wavelength, and attenuates the selected optical signal. The optical module 523 further outputs the selected and attenuated optical signal from the first port 526a. The control module 524 further controls the optical module 523 based on information from the OCM 608 such that the intensity of the optical signal output from the first port 526a coincides with the target value.

—Power Monitor—

The power monitor 511 includes a detector module that measures the intensity of the entire input optical signal, and a processing circuit that outputs the measurement result. The same applies to the power monitor 611.

—Optical Amplifier—

Figure 16:
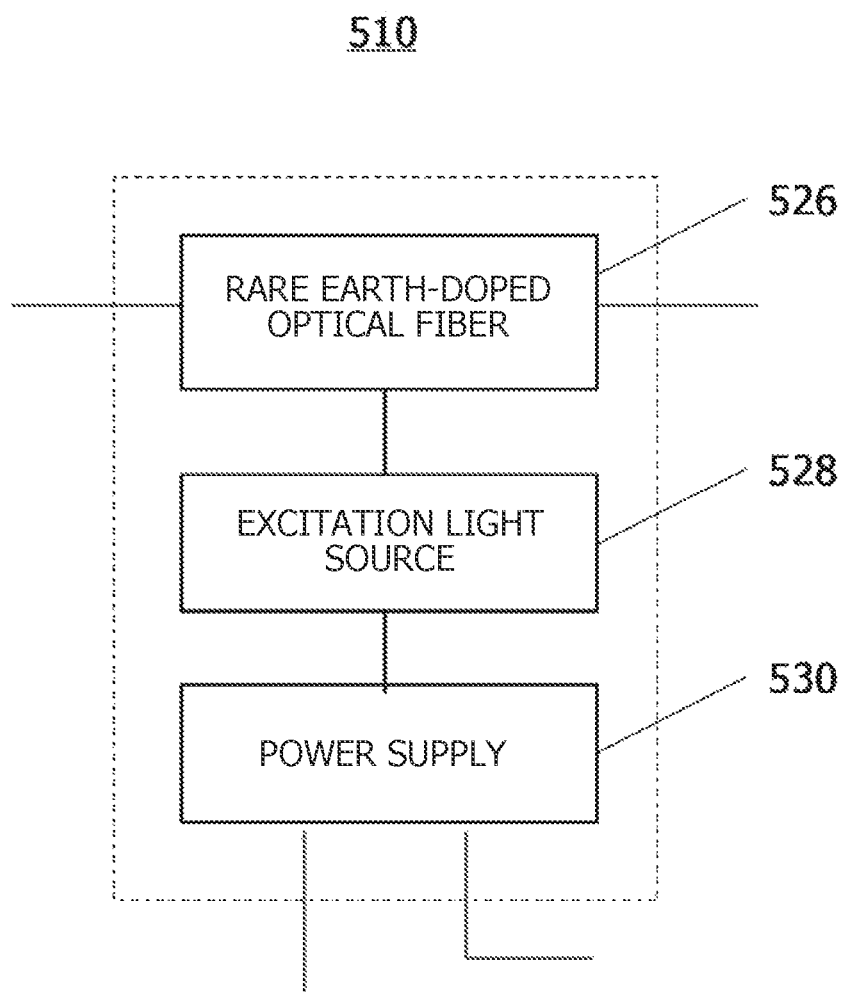
FIG. 16 is a diagram illustrating an example of the structure of a post-optical amplifier 510.

FIG. 16 is a diagram illustrating an example of the structure of the post-optical amplifier 510.

The post-optical amplifier 510 includes a rare earth-doped optical fiber 526, an excitation light source 528 that excites the rare earth-doped optical fiber 526, and a power supply 530 that supplies power to the excitation light source 528. The rare earth-doped optical fiber 526 is, for example, an erbium-doped optical fiber. The rare earth-doped optical fiber 526 amplifies the input optical signal and outputs the amplified optical signal.

The power supply 530 controls the excitation light source 528 based on information from the power monitor 511. For example, the power supply 530 adjusts the power supplied to the excitation light source 528 based on the information from the power monitor 511 such that the output of the rare earth-doped optical fiber 526 coincides with the target value.

The structure and operation of the pre-optical amplifier 610 are substantially the same as the structure and operation of the post-optical amplifier 510.

—Transmission/Reception Module—

Figure 17:
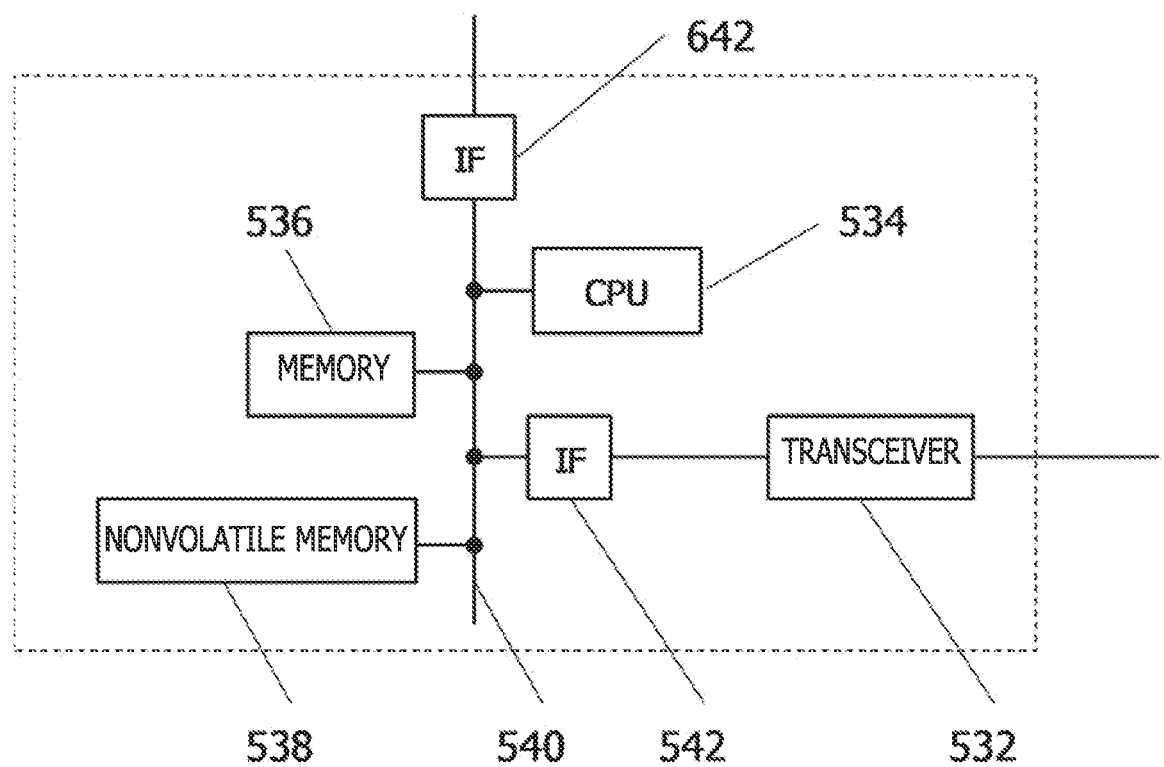
FIG. 17 is a diagram illustrating an example of the structure of a transmission/reception module 522.

FIG. 17 is a diagram illustrating an example of the structure of the transmission/reception module 522. The transmission/reception module 522 includes a transceiver 532. The transmission/reception module 522 further includes a central processing unit (CPU) 534, a memory 536, and a nonvolatile memory 538. The memory 536 is, for example, a random access memory (RAM). The nonvolatile memory 538 is, for example, a flash memory. The transmission/reception module 522 further includes a bus 540, an interface 542 that connects the transceiver 532 to the bus 540, and an interface 642 that connects the FPGA 520 to the bus 540.

The CPU 534 is coupled to the memory 536 via the bus 540, and is configured to execute a program recorded in, for example, the nonvolatile memory 538. The CPU 534 exchanges information with the external system and the like via the transceiver 532. The CPU 534 further exchanges information with the FPGA 520 via the interface 642.

(1-2) Functional Block Diagram

FIG. 18 is an example of a functional block diagram of the optical add-drop multiplexer 202 according to the second embodiment. The optical add-drop multiplexer 202 of the second embodiment includes a dropping unit 406 and an adding unit 404. The dropping unit 406 is an example of the dropping unit 6 of the first embodiment. The adding unit 404 is an example of the adding unit 4 of the first embodiment. The dropping unit 406 is implemented by the pre-WSS 504 (refer to FIG. 14), the plurality of demultiplexers 506, the OCM 508, and the FPGA 520. The adding unit 404 is implemented by the post-WSS 604, the demultiplexer 606, the OCM 608, and the FPGA 520. For example, the FPGA 520, based on device information 579 or the like (refer to FIG. 24) described later, sets a path that connects the input port and the output port of the pre-WSS 504 (or the post-WSS 604) based on.

The optical add-drop multiplexer 202 of the second embodiment further includes a multiplexing unit (not illustrated) and a demultiplexing unit (not illustrated). The multiplexing unit of the second embodiment is an example of the third multiplexing unit 14 of the first embodiment. The demultiplexing unit of the second embodiment is an example of the demultiplexing unit 12 of the first embodiment. The multiplexing unit and the demultiplexing unit of the second embodiment are implemented by an AWG, an MCS, and the like.

The optical add-drop multiplexer 202 further includes a pre-optical amplifying unit 408 and a post-optical amplifying unit 410. The pre-optical amplifying unit 408 is an example of the pre-optical amplifying unit 8 of the first embodiment. The post-optical amplifying unit 410 is an example of the post-optical amplifying unit 10 of the first embodiment. The pre-optical amplifying unit 408 is implemented by the pre-optical amplifier 610 (refer to FIG. 14), the demultiplexer 806, and the power monitor 611. The post-optical amplifying unit 410 is implemented by the post-optical amplifier 510, the demultiplexer 706, and the power monitor 511.

The optical add-drop multiplexer 202 further includes a control unit 416. The control unit 416 includes an optical circuit type/output level correspondence table storage unit 550, an optical circuit type information management unit 552, an output level target value setting unit 554, and an amplifier average output level target value setting unit 556. The control unit 416 is implemented by, for example, the FPGA 520 (refer to FIG. 14).

The optical add-drop multiplexer 202 further includes the optical multiplexer 512 and the optical demultiplexer 612. The optical multiplexer 512 and the optical demultiplexer 612 are the devices described with reference to FIG. 14.

The optical add-drop multiplexer 202 further includes an OSC receiving unit 544 and an OSC transmitting unit 546.

The OSC receiving unit 544 is implemented by the OSC receiver 514 (refer to FIG. 14). The OSC transmitting unit 546 is implemented by the OSC transmitter 515 (refer to FIG. 14). The optical add-drop multiplexer 202 further includes an information transmitting/receiving unit 548. The information transmitting/receiving unit 548 is implemented by the transmission/reception module 522 (refer to FIG. 14).

The optical multiplexer 512, the optical demultiplexer 612, the OSC receiving unit 544, the OSC transmitting unit 546, and the transmission/reception module 522 may be provided outside the optical add-drop multiplexer 202.

(2) OPERATION (2-1) Types of Multiplexing Units

Similar to the optical add-drop multiplexer 2 of the first embodiment, the optical add-drop multiplexer 202 of the second embodiment accepts inputs of the drop signal 18 (refer to FIG. 2) and the through signal 20, and outputs the through signal 20 and the add signal 22. The drop signal 18, the through signal 20, and the add signal 22 are, for example, optical signals that have been generated by the transmitter and have passed through the first to third multiplexing units (refer to FIG. 2).

The first to third multiplexing units may all be optical circuits belonging to the same type, or some or all of the first to third multiplexing units may be optical circuits belonging to distinct types.

FIGS. 19A to 19C and 20A to 20B are diagrams illustrating examples of optical circuits used as the first to third multiplexing units. The line segments illustrated in FIGS. 19A to 19C and 20A to 20B indicate optical signal paths. When each optical circuit illustrated in FIGS. 19A to 20B is used as a multiplexing unit (hereinafter referred to as an Add unit), the optical signal enters the optical circuit through a lower-side line segment and the optical signal exits from the optical circuit through an upper-side line segment. The respective optical circuits in FIGS. 19A to 19C and 20A to 20B are classified into distinct types.

Figure 19A:
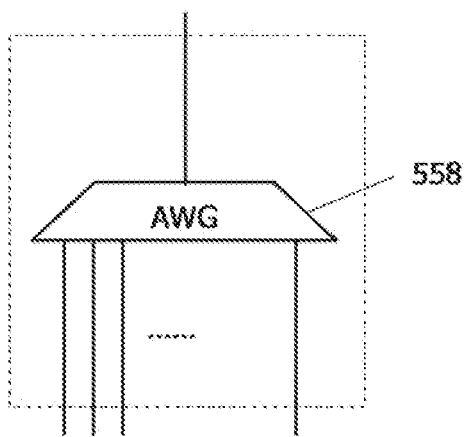
FIG. 19A is diagram illustrating examples of optical circuits used as first to third multiplexing units.

The optical circuit in FIG. 19A is an optical circuit that includes an AWG 558. The optical circuit in FIG. 19A is an optical circuit having a non colorless directionless contentionless (CDC) configuration.

Figure 19B:
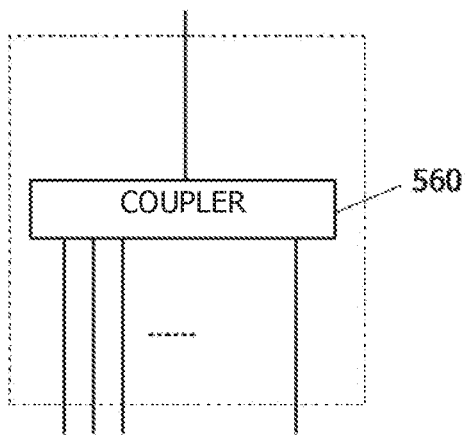
FIG. 19B is diagram illustrating examples of optical circuits used as first to third multiplexing units.

The optical circuit in FIG. 19B is an optical circuit that includes a coupler 560 (which is an optical splitter). The optical circuit in FIG. 19B is an optical circuit having a colorless configuration.

Figure 19C:
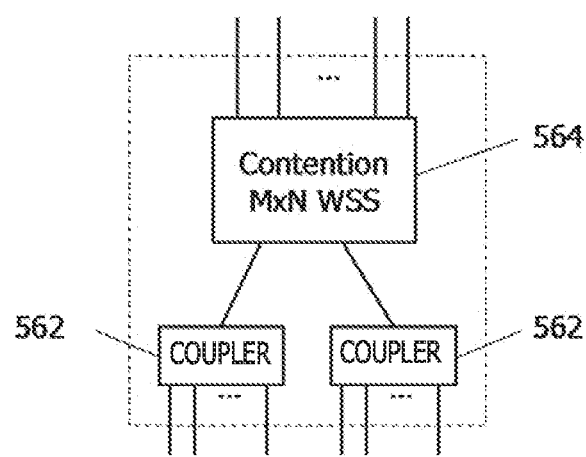
FIG. 19C is diagram illustrating examples of optical circuits used as first to third multiplexing units.

The optical circuit in FIG. 19C is an optical circuit that includes a plurality of couplers 562 and a contentionless WSS 564 to which the plurality of couplers 562 is connected. The optical circuit in FIG. 19C is an optical circuit having a colorless directionless (CD) configuration.

Figure 20A:
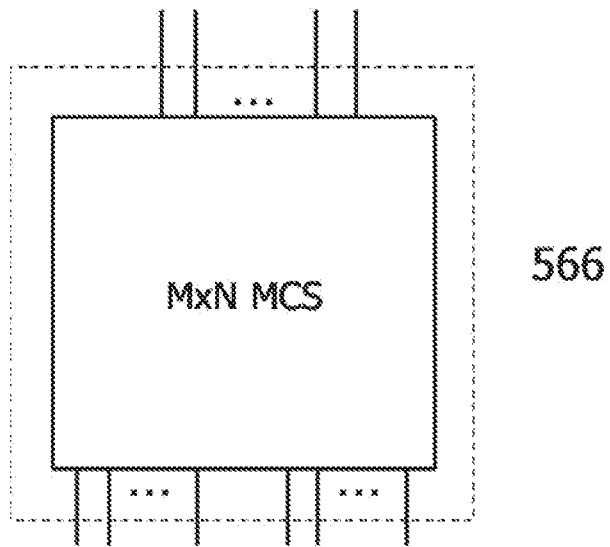
FIG. 20A is diagram illustrating examples of optical circuits used as the first to third multiplexing units.

The optical circuit in FIG. 20A is an optical circuit that includes an M×N multicast switch (MCS) 566. The optical circuit in FIG. 20A is an optical circuit having a CDC configuration.

Figure 20B:
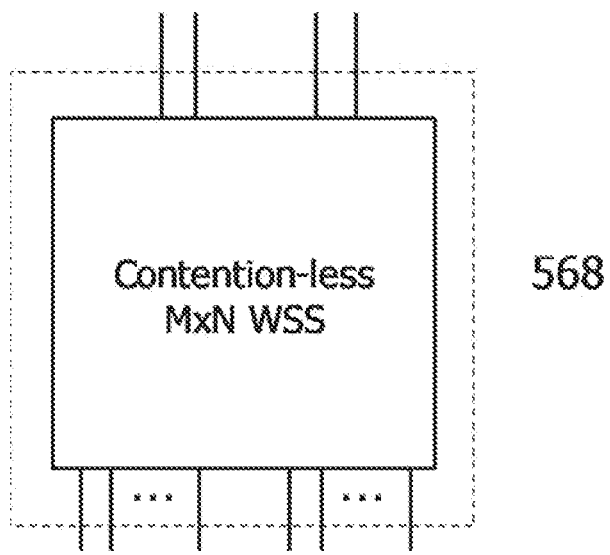
FIG. 20B is diagram illustrating examples of optical circuits used as the first to third multiplexing units.

The optical circuit in FIG. 20B is an optical circuit that includes a contentionless M×N WSS 568 (for example, refer to Japanese Laid-open Patent Publication No. 2009-033543). The optical circuit in FIG. 20B is an optical circuit having a CDC configuration.

The type of the optical circuit in FIG. 19C is hereinafter referred to as CD SPL. The type of the optical circuit in FIG.

20A is referred to as CDC MCS. The type of the optical circuit in FIG. 20B is referred to as CDC WSS.

(2-2) Types of Demultiplexing Units

Similar to the first embodiment, the drop signal 18 input to the optical add-drop multiplexer 202 (refer to FIG. 2) of the second embodiment is dropped by the dropping unit 406 from the flow of the optical signal transferred in the optical communication system 5. Moreover, the drop signal 18 is decomposed into, for example, optical signals having different wavelengths from each other by the demultiplexing unit.

The demultiplexing unit is implemented by, for example, the optical circuits illustrated in FIGS. 19A to 19C and 20A to 20B. When the optical circuits in FIGS. 19A to 19C and 20A to 20B are used as the demultiplexing unit, the optical signal enters the optical circuit through an upper-side line segment and exits from the optical circuit through a lower-side line segment in each figure.

(2-3) Optical Circuit Information

FIG. 21 is a table 570 (hereinafter referred to as an optical circuit type information table) illustrating an example of information managed by the optical circuit type information management unit 552 (hereinafter referred to as optical circuit information or optical circuit type information). The optical circuit information is recorded in the optical circuit type information management unit 552, for example.

Channel numbers are illustrated in the first column of the optical circuit type information table 570. The channel number corresponds to the wavelength of the optical signal input to or output from the optical add-drop multiplexer 202. The wavelength corresponding to each channel number is a wavelength different from the wavelengths corresponding to other channel numbers.

Path settings are illustrated in the second column of the optical circuit type information table 570. The Path setting indicates the type of the optical signal. "Add" indicates that the optical signal is the add signal. "Thru" indicates that the optical signal is the through signal. "Drop" indicates that the optical signal is the drop signal.

The types of the optical circuit of the Add unit (which is the multiplexing unit) are illustrated in the third column of the optical circuit type information table 570. The types of the optical circuit of the demultiplexing unit are illustrated in the fourth column of the optical circuit type information table 570.

The second row of the optical circuit type information table 570 indicates that the add signal 22 whose wavelength is a wavelength λ1 with the channel number "1" is multiplexed by an optical circuit classified as CDC MCS, and then output to the optical line 224 via the adding unit 404.

The fourth row of the optical circuit type information table 570 indicates that the through signal 20 whose wavelength is a wavelength λ3 with the channel number "3" is multiplexed by an optical circuit classified as CD SPL in a device different from the optical add-drop multiplexer 202. The fourth row of the optical circuit type information table 570 further indicates that the above-mentioned through signal 20 passes through the optical add-drop multiplexer 202 and is output to the optical line 224.

The fifth row of the optical circuit type information table 570 indicates that the drop signal 18 whose wavelength is a wavelength λ4 with the channel number "4" is multiplexed by an optical circuit classified as CDC WSS in a device different from the optical add-drop multiplexer 202. The fifth row of the optical circuit type information table 570 further indicates that the above-mentioned drop signal 18 is dropped by the dropping unit 406 and then passes through an optical circuit classified as CDC WSS. The drop signal 18 that has passed through the optical circuit is received by the receiver.

(2-4) Output Level Target Value

Figure 22:
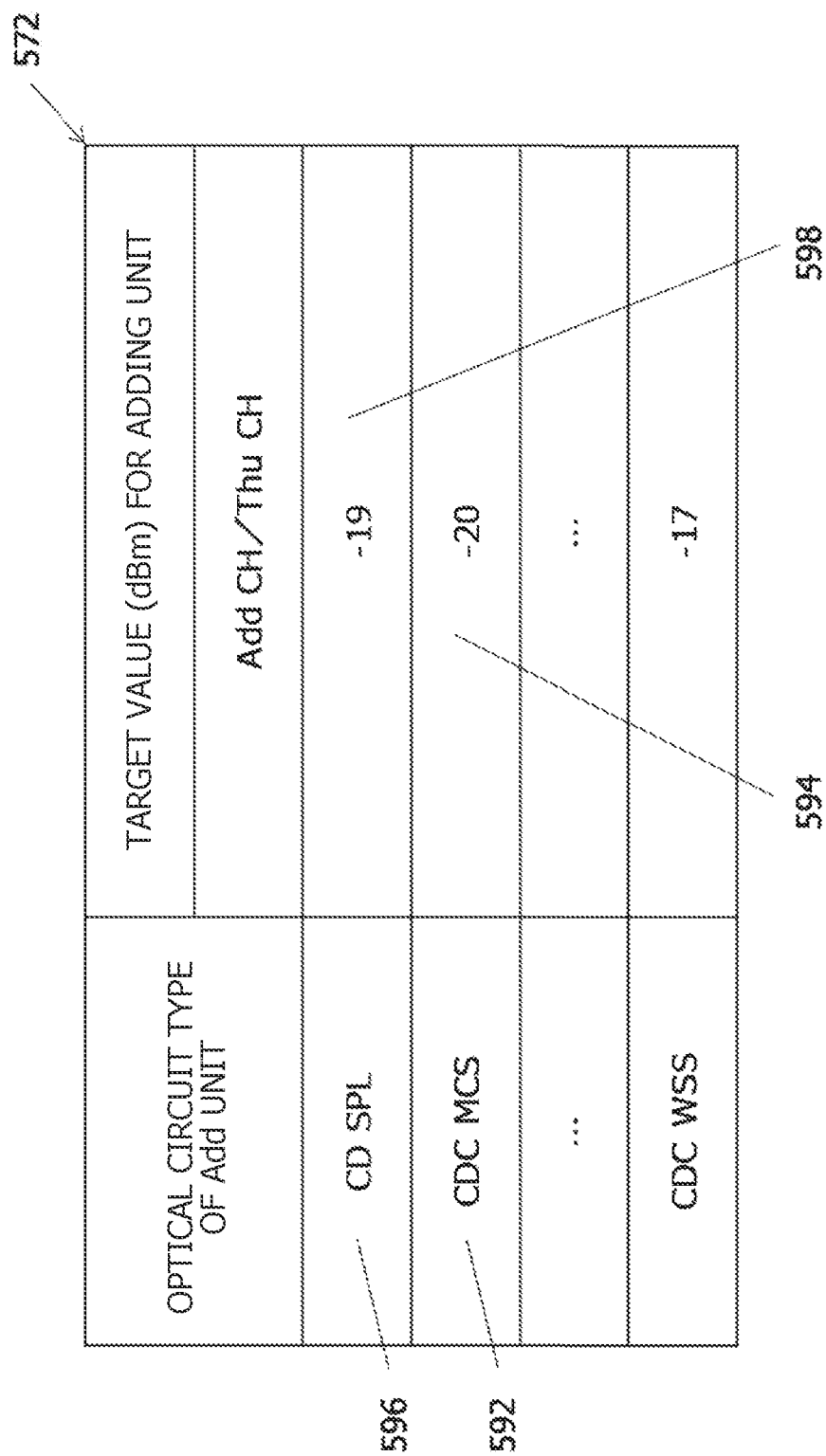
FIG. 22 is a diagram illustrating an example of information recorded in an optical circuit type/output level correspondence table storage unit 550.

FIGS. 22 and 23 are diagrams illustrating examples of information recorded in the optical circuit type/output level correspondence table storage unit 550 (hereinafter referred to as an output level target value). The output level target value is recorded in advance in the optical circuit type/output level correspondence table storage unit 550 before the service of the optical add-drop multiplexer 202 is started, for example.

—Target Value for Adding Unit 404—

A table 572 illustrated in FIG. 22 (hereinafter referred to as a first output level target value table) is a table illustrating an example of a target value (which is the first output level target value) when the adding unit 404 attenuates the optical signal.

The types of the optical circuit that implements the Add unit (which is the multiplexing unit) through which the through signal 20 (refer to FIG. 2) or the add signal 22 passes are illustrated in the first column of the first output level target value table 572.

The target values for the add signal 22 are illustrated in the second column of the first output level target value table 572. For example, the second column of the first output level target value table 572 denotes the first output level target value when the adding unit 404 attenuates the add signal 22 (refer to FIG. 2) in a case where the type of the Add unit (which is the third multiplexing unit 14) through which the add signal 22 passes has the type in the first column. The unit of the target value is, for example, decibel-milliwatt (dBm). The same applies to other target values described later.

The target values for the through signal 20 are further illustrated in the second column of the first output level target value table 572. For example, the second column of the first output level target value table 572 records the target value when the adding unit 404 attenuates the through signal 20 in a case where the type of the Add unit (which is the second multiplexing unit 14b) through which the through signal 20 passes has the type in the first column. For example, the second column of the first output level target value table 572 indicates the target value of automatic level control (ALC) in the post-WSS 604 (refer to FIG. 14).

For example, the last row of the first output level target value table 572 indicates that, in a case where the Add unit through which the add signal 22 passes is CDC WSS, the target value when the adding unit 404 attenuates the add signal 22 is −17 dBm. The last row of the first output level target value table 572 further indicates that, in a case where the type of the Add unit (which is the second multiplexing unit 14b) through which the through signal 20 passes is CDC WSS, the target value when the adding unit 404 attenuates the through signal 20 is −17 dBm.

As described with reference to FIGS. 10 and 11, the target values denoted in the first output level target value table 572 are each a value according to the intensity change rate (which is loss) when the add signal 22 or the through signal 20 passes through the Add unit (the third multiplexing unit 14 or the second multiplexing unit 14b).

—Target Value for Dropping Unit 406—

A table 574 illustrated in FIG. 23 (hereinafter referred to as a second and third output level target value table) is a table illustrating an example of a target value when the dropping unit 406 (refer to FIG. 18) attenuates the optical signal (which is the second or third target value).

The types of the optical circuit that implements the Add unit (which is the first multiplexing unit 14a or the second multiplexing unit 14b) through which the drop signal 18 (refer to FIG. 2) or the through signal 20 passes are illustrated in the first column of the second and third output level target value table 574.

The target values (which are the third output level target values) for the through signal 20 are illustrated the second column of the second and third output level target value table 574. For example, the second column of the second and third output level target value table 574 denotes the target value when the dropping unit 406 attenuates the through signal 20 in a case where the type of the Add unit (which is the second multiplexing unit 14b) through which the through signal 20 passes has the type in the first column.

For example, the first and second columns of the third row from the bottom of the second and third output level target value table 574 indicate that, in a case where the Add unit through which the through signal 20 (refer to FIG. 2) passes is CDC MCS, the target value when the dropping unit 406 attenuates the through signal 20 is −5 dBm.

The target values (which are the second output level target values) for the drop signal 18 are illustrated the third and subsequent columns of the second and third output level target value table 574. For example, the third and subsequent columns of the second and third output level target value table 574 record the second output level target values when the dropping unit 406 attenuates the drop signal 18 in a case where the type of the Add unit (which is the first multiplexing unit 14a) through which the drop signal 18 passes has the type in the first column.

The second output level target value is a value according to the type of the optical circuit that implements the Drop unit (which is the demultiplexing unit 12) to which the drop signal 18 is input. For example, the first and third columns of the third row from the bottom of the second and third output level target value table 574 indicate that, in a case where the Add unit through which the drop signal 18 passes is CDC MCS, and besides the Drop unit through which the drop signal 18 passes is CD SPL, the target value when the dropping unit 406 attenuates the drop signal 18 is −3 dBm.

This means that the second and subsequent columns of the second and third output level target value table 574 indicate the target value of automatic level control (ALC) in the pre-WSS 504 (refer to FIG. 14).

As described with reference to FIGS. 10 and 11, the target values (which are the third output level target values) indicated in the second column of the second and third output level target value table 574 are each a value according to the intensity change rate (which is loss) when the through signal 20 passes through the Add unit (the second multiplexing unit 14b). The target values (which are the second output level target values) indicated in the third to sixth columns of the second and third output level target value table 574 are each a value according to the type of the Drop unit (which is the demultiplexing unit 12) through which the through signal 20 passes.

(2-5) Management of Optical Circuit Information (Which is Optical Circuit Type Information)

Figure 24:
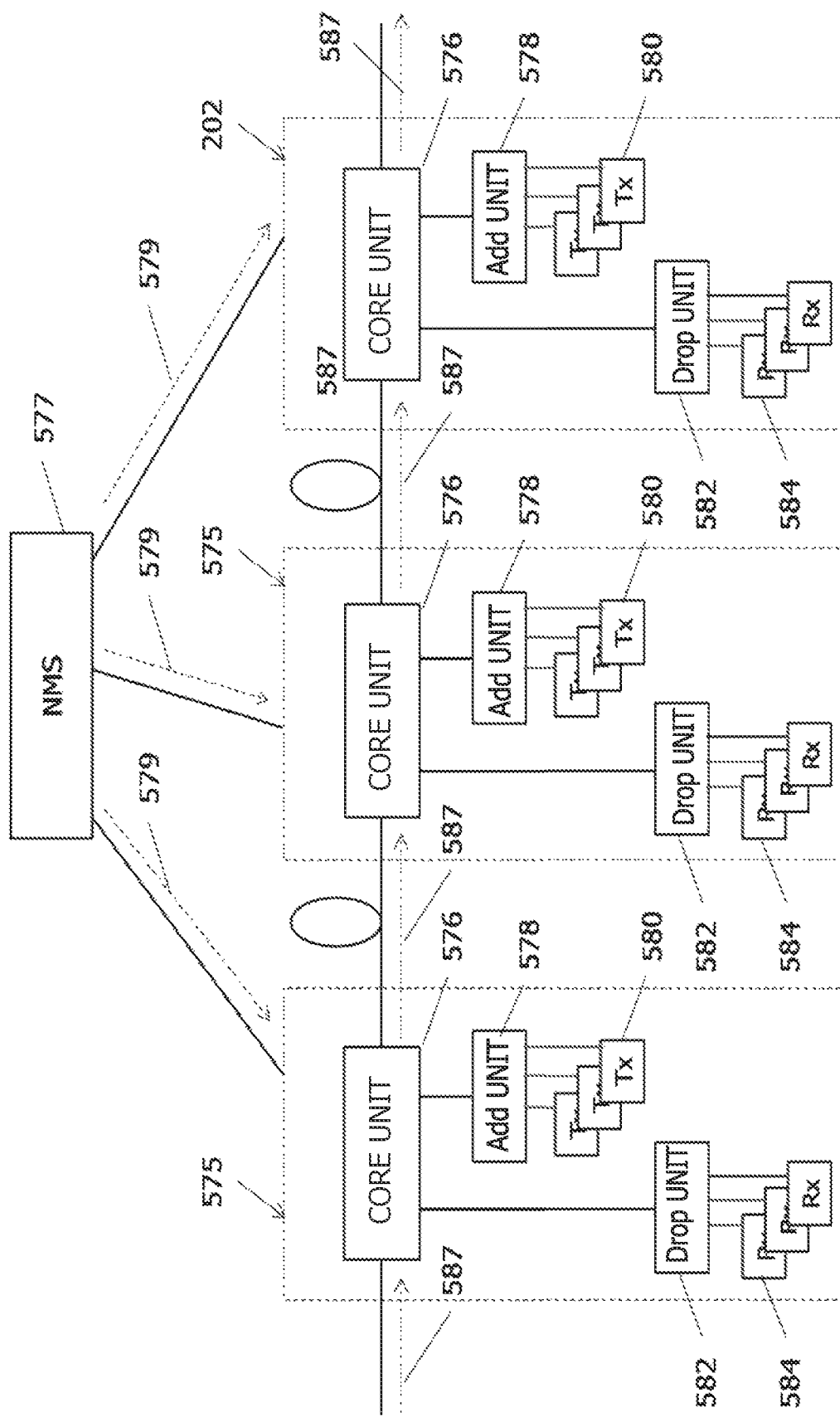
FIG. 24 is a diagram for explaining an optical supervisory channel (OSC) transfer signal 587 and a network management system (NMS) 577 used to manage optical circuit information.

FIG. 24 is a diagram for explaining an OSC transfer signal 587 and an NMS 577 used to manage the optical circuit information (refer to FIG. 21). FIG. 24 illustrates an optical communication system 405 including the optical add-drop multiplexer 202 of the second embodiment. The optical communication system 405 further includes optical add-drop multiplexers (hereinafter each referred to as another station 575) different from the optical add-drop multiplexer 202.

The another station 575 is an example of the first optical add-drop multiplexer 2a and the second optical add-drop multiplexer 2b described with reference to FIGS. 1 and 2. The optical communication system 405 further includes the network management system (NMS) 577 connected to each optical add-drop multiplexer.

The optical add-drop multiplexer 202 and the another station 575 each include a core unit 576, an Add unit 578 of which one end is connected to the core unit 576, and a plurality of transmitters 580 connected to another end of the Add unit 578. Moreover, the optical add-drop multiplexer 202 and the another station 575 each include a Drop unit 582 of which one end is connected to the core unit 576, and a plurality of receivers 584 connected to another end of the Drop unit 582.

The core unit 576 of the optical add-drop multiplexer 202 is, for example, a portion of the device described with reference to FIG. 18 obtained by removing the demultiplexing unit and the third multiplexing unit from the device. The Add unit 578 and the Drop unit 582 are, for example, the optical circuits described with reference to FIGS. 19A to 19c and 20A to 20B.

The core unit 576 of the another station 575 is, for example, substantially the same device as the core unit 576 of the optical add-drop multiplexer 202. The same applies to the Add unit 578 and the Drop unit 582 of the another station 575.

Figure 25:
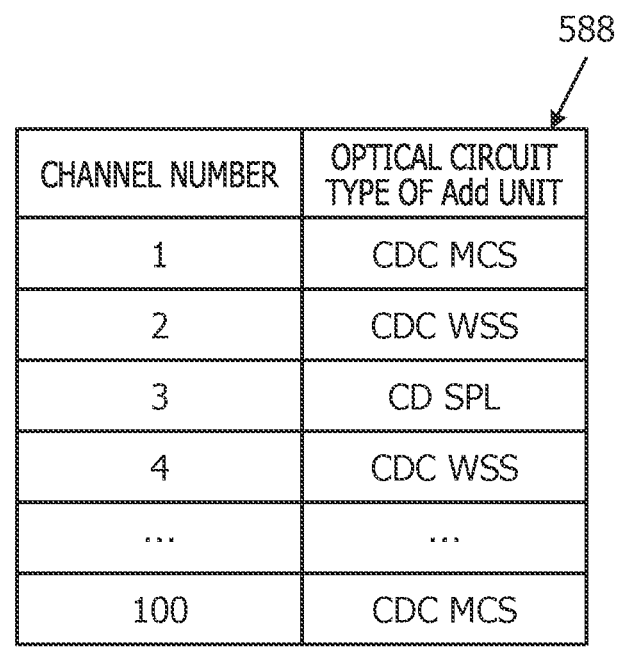
FIG. 25 is a diagram illustrating an example of information conveyed by the OSC transfer signal 587 according to the second embodiment.

FIG. 25 is a diagram illustrating an example of information conveyed by the OSC transfer signal 587 (hereinafter referred to as OSC transfer information) according to the second embodiment. The OSC transfer signal 587 is successively transferred from one optical add-drop multiplexer (which is the another station 575 or the optical add-drop multiplexer 202) to an adjacent optical add-drop multiplexer.

FIG. 25 illustrates a table 588 indicating an example of the OSC transfer information. Channel numbers are illustrated in the first column of the table 588. The types (for example, CDC MCS) of the optical circuit of the Add unit through which the optical signal whose wavelength is the wavelength λ1 with the channel number (for example, "1") in the first column passes are illustrated in the second column of the table 588.

The OSC transfer signal 587 is periodically input from the adjacent another station 575. The OSC transfer information is input to the optical circuit type information management unit 552 via the optical demultiplexer 612 (refer to FIG. 18) and the OSC receiving unit 544.

The optical circuit type information management unit 552 updates a portion relating to the another station 575 in the optical circuit type information table 570 (refer to FIG. 21) based on the input OSC transfer information. For example, "optical circuit type of Add unit" in the row of the channel number "3" of the optical circuit type information table 570 (the row of which the Path setting has "Thru") is updated with "CD SPL" in the row of the channel number "3" of the table 588 in FIG. 25.

The optical circuit type information management unit 552 further records "optical circuit type of Add unit" of its own station (which is the optical add-drop multiplexer 202) in the OSC transfer information, and transmits the OSC transfer information to another station on a downstream side. The OSC transfer information is transmitted via the OSC transmitting unit 546 (refer to FIG. 18) and the optical multiplexer 512.

For example, the optical circuit type information management unit 552 records "circuit type of Add unit" (for example, CDC MCS) of an optical signal (for example, an optical signal with the channel number "1") whose Path setting in the optical circuit type information table 570 (refer to FIG. 21) has "Add", in the table 588 in FIG. 25. The row to be recorded is a row with the channel number "1" (which is the second row).

The optical circuit type information management unit 552 further acquires information regarding its own station in the optical circuit type information table 570 (hereinafter, referred to as device information 579) from the NMS 577 (refer to FIG. 24) via the information transmitting/receiving unit 548, and registers the acquired information to the optical circuit type information table 570 (refer to FIG. 21).

For example, the optical circuit type information management unit 552 acquires the channel number of the optical signal (which is the add signal 22) that passes through the Add unit of its own station, the Path setting (here, "Add"), and the optical circuit type of the Add unit from the NMS 577, and records the acquired information in the optical circuit type information table 570 in FIG. 21. The optical circuit type information management unit 552 further acquires the channel number of the optical signal (which is the drop signal 18) that passes through the Drop unit of its own station, the Path setting (here, "Drop"), and the optical circuit type of the Drop unit from the NMS 577, and records the acquired information in the optical circuit type information table 570 in FIG. 21.

The device information 579 (refer to FIG. 24) also includes information indicating the output destination port of each optical signal input to the dropping unit 406. Based on this information, the dropping unit 406 sets the output destination port of each optical signal. For example, the FPGA 520 that has received the device information 579 via the transmission/reception module 522 (refer to FIG. 15) instructs the control module 524 of the pre-WSS 504 about the output destination port of each optical signal. The control module 524 of the pre-WSS 504 controls the optical module 523 of the pre-WSS 504 in accordance with this instruction.

The device information 579 also includes information indicating which one of a plurality of optical signals input to the adding unit 404 is to be sent out to the optical line 224. Based on this information, the adding unit 404 sends out the through signal 20 and the add signal 22 to the optical line 224.

For example, the FPGA 520 that has received the device information 579 via the transmission/reception module 522 (refer to FIG. 15) notifies the control module 524 of the post-WSS 604 of the wavelengths of the through signal 20 and the add signal 22. The control module 524 of the post-WSS 604 controls the optical module 523 of the post-WSS 604 in accordance with this notification.

The information regarding the own station is input by the NMS 577 when a new optical path through the own station is set up. The information regarding the own station may be input from a user terminal. Alternatively, the information regarding the own station may be delivered by the OSC transfer signal 587.

(2-6) Setting of Target Value and Amplification Target Value

Figure 26:
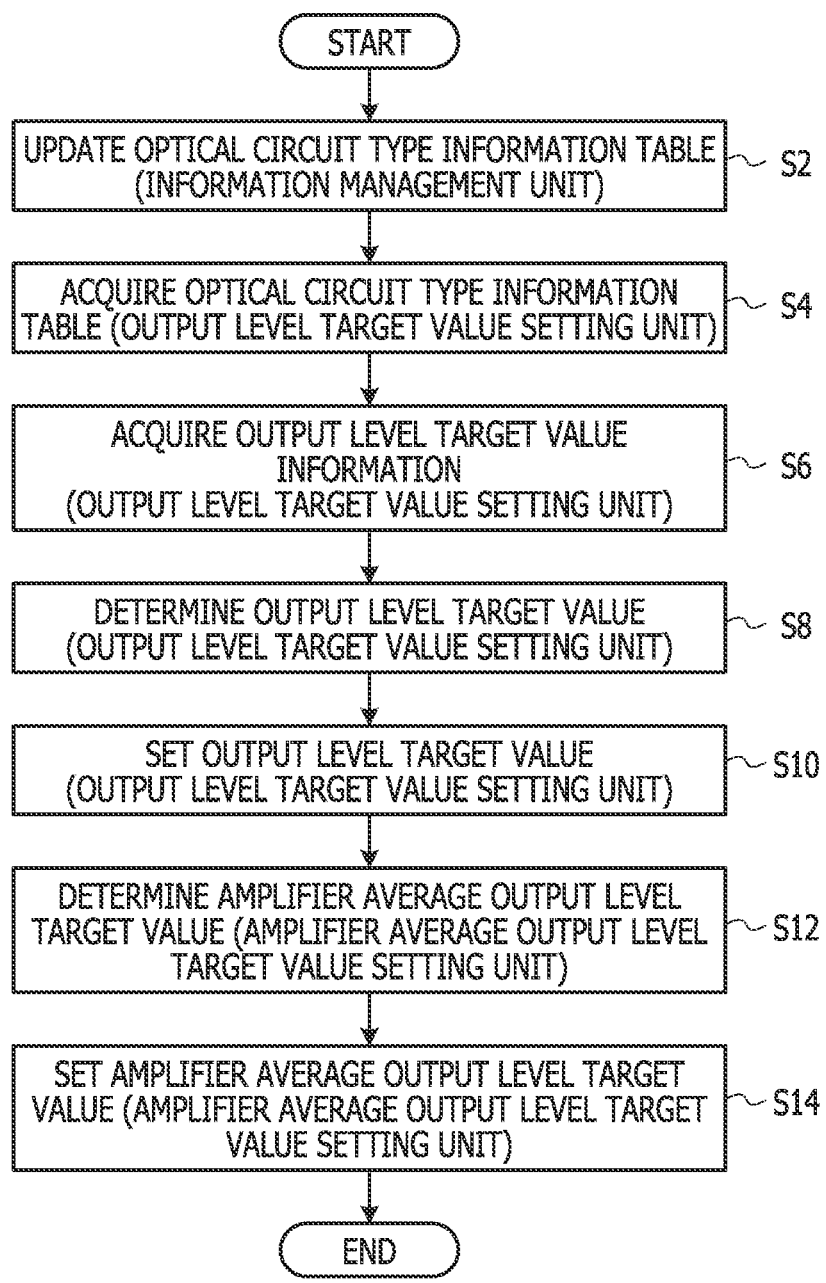
FIG. 26 is a flowchart illustrating an example of processing executed by a control unit 416.

FIG. 26 is a flowchart illustrating an example of processing executed by the control unit 416 (refer to FIG. 18). The control unit 416 sets the first to third target values (refer to the first embodiment) in the adding unit 404 and the dropping unit 406, for example, based on the flowchart in FIG. 26 (step S10). The control unit 416 further sets a target value of output intensity (hereinafter, referred to as an amplification target value) in the pre-optical amplifying unit 408 and the post-optical amplifying unit 410 (step S14).

First, the optical circuit type information management unit 552 (refer to FIG. 18) of the control unit 416 updates the optical circuit type information table 570 (refer to FIG. 21) based on the most recently received OSC transfer signal 587 (refer to FIG. 24) (step S2). The optical circuit type information table 570 is a table that indicates the optical circuit information.

After step S2, the output level target value setting unit 554 (refer to FIG. 18) of the control unit 416 acquires the updated optical circuit type information table 570 (refer to FIG. 21) from the optical circuit type information management unit 552 (step S4).

The output level target value setting unit 554 further acquires the first output level target value table 572 (refer to FIG. 22), which indicates the output level target value for the adding unit 404 (refer to FIG. 18), from the optical circuit type/output level correspondence table storage unit 550 (step S6). The output level target value setting unit 554 further acquires the second and third output level target value table 574 (refer to FIG. 23), which indicates the output level target value for the dropping unit 406 (refer to FIG. 18), from the optical circuit type/output level correspondence table storage unit 550 (refer to FIG. 18) (step S6). Step S6 may be executed before step S4.

After step S6, the output level target value setting unit 554 determines the first output level target value for the adding unit 404, based on the optical circuit type information table 570 (refer to FIG. 21) acquired in step S4, and the first output level target value table 572 (refer to FIG. 22) acquired in step S6 (step S8). The output level target value setting unit 554 (refer to FIG. 18) further determines the second and third target values for the dropping unit 406, based on the optical circuit type information table 570 (refer to FIG. 21) acquired in step S4, and the second and third output level target value table 574 (refer to FIG. 23) acquired in step S6 (step S8).

—Determination of First Output Level Target Value for Add Signal 22 (Part of Step S8)—

The first output level target value is a target value when the adding unit 404 attenuates the optical signal. FIG. 27 is a diagram illustrating an example of a table 590 (hereinafter referred to as a first result table) in which the result of step S8 is recorded. Channel numbers are recorded in the first column of the first result table 590. Path settings are recorded in the second column of the first result table 590. The first output level target values (which are ALC target values for the post-WSS) are recorded in the third column of the first result table 590.

The output level target value setting unit 554 (refer to FIG. 18) acquires "channel number" (for example, "1") in a row in which the cell in the second column has "Add", from the optical circuit type information table 570 (refer to FIG. 21) acquired in step S4. The output level target value setting unit 554 further acquires "optical circuit type of Add unit" (for example, "CDC MCS" 592) recorded in the above-mentioned row.

The output level target value setting unit 554 specifies, in the first output level target value table 572 (refer to FIG. 22) acquired in step S6, a row (for example, the third row from the bottom) in which the contents of the cell in the first column match the contents of above-mentioned "optical circuit type of Add unit" (for example, "CDC MCS" 592) acquired from the optical circuit type information table 570 (refer to FIG. 21). The output level target value setting unit 554 acquires the target value (for example, "−20" 594) recorded in the second cell of the specified row (for example, the third row from the bottom).

The output level target value setting unit 554 specifies a row of the first result table 590 (refer to FIG. 27) in which "channel number" (for example, "1") acquired from the optical circuit type information table 570 (refer to FIG. 21) is recorded in the cell in the first column (for example, the second row). The output level target value setting unit 554 records "Add" in the cell in the second column of the above-specified row (for example, the second row). The output level target value setting unit 554 further records the target value (for example, "−20" 594) acquired from the first output level target value table 572 (refer to FIG. 22), in the cell in the third column of the above-specified row (for example, the second row).

The output level target value setting unit 554 (refer to FIG. 18) execute the above processing on all the other rows of the optical circuit type information table 570 (refer to FIG. 21) in which "Add unit" is recorded in the cell in the second column.

As described above, the output level target value setting unit 554 of the control unit 416 (FIG. 18) determines the first output level target value for the add signal 22 (refer to FIG. 2), based on the information indicating the type of the optical circuit included in the Add unit (which is the third multiplexing unit) through which the add signal 22 passes. The above-mentioned information is hereinafter referred to as third optical circuit information (for example, "CDC MCS" 592). The above-mentioned optical circuit is an optical circuit that implements the Add unit (which is the third multiplexing unit) through which the add signal 22 passes.

—Determination of First Output Level Target Value for Through Signal 20 (Continuation of Step S8)—

The output level target value setting unit 554 (refer to FIG. 18) acquires "channel number" (for example, "3") and "optical circuit type of Add unit" (for example, "CD SPL" 596) in a row in which the cell in the second column has "Thru", from the optical circuit type information table 570 (refer to FIG. 21) acquired in step S4.

The output level target value setting unit 554 specifies a row (for example, the fourth row from the bottom) of which the cell in the first column matches above-acquired "optical circuit type of Add unit" (for example, "CD SPL" 596), from among the rows of the first output level target value table 572 (refer to FIG. 22) acquired in step S6. The output level target value setting unit 554 acquires the target value (for example, "−19" 598) recorded in the second cell of the specified row (for example, the fourth row from the bottom).

The output level target value setting unit 554 specifies a row in which "channel number" (for example, "3") acquired from the optical circuit type information table 570 (refer to FIG. 21) is recorded in the cell in the first column (for example, the fourth row), from among the rows of the first result table 590 (refer to FIG. 27). The output level target value setting unit 554 records "Thru" in the cell in the second column of the above-specified row (for example, the fourth row). The output level target value setting unit 554 further records the target value (for example, "−19" 598) acquired from the first output level target value table 572 (refer to FIG. 22), in the cell in the third column of the above-specified row (for example, the fourth row).

The output level target value setting unit 554 (refer to FIG. 18) execute the above processing on all the other rows (for example, the seventh row) of the optical circuit type information table 570 (refer to FIG. 21) in which "Thru" is recorded in the cell in the second column.

As described above, the output level target value setting unit 554 of the control unit 416 (FIG. 18) determines the first output level target value for the through signal, based on the information (for example, CD SPL) indicating the type of the optical circuit included in the Add unit (which is the second multiplexing unit) through which the through signal 20 (refer to FIG. 2) passes. The above-mentioned information (for example, "CD SPL" 596) is hereinafter referred to as second optical circuit information. The above-mentioned optical circuit is an optical circuit that implements the Add unit (which is the second multiplexing unit) through which the through signal 20 passes.

—Determination of Second Output Level Target Value for Drop Signal (Continuation of Step S8)—

The second output level target value is a target value when the dropping unit 406 (refer to FIG. 18) attenuates the drop signal 18 (refer to FIG. 2).

FIG. 28 is a diagram illustrating an example of another table 591 (hereinafter referred to as a second result table) in which the result of step S8 is recorded. Channel numbers are recorded in the first column of the second result table. Path settings are recorded in the second column of the second result table. The second output level target values and the third output level target values (which are ALC target values for the pre-WSS) are recorded in the third column of the second result table.

The output level target value setting unit 554 (refer to FIG. 18) acquires "channel number" (for example, "4") in a row in which the cell in the second column has "Drop", from the optical circuit type information table 570 (refer to FIG. 21) acquired in step S4. The output level target value setting unit 554 further acquires "optical circuit type of Add unit" (for example, "CDC WSS" 900) and "optical circuit type of Drop unit" (for example, "CDC WSS" 902) from the above-mentioned row.

The output level target value setting unit 554 specifies a row (for example, the last row) of which the cell in the first column matches above-acquired "optical circuit type of Add unit" (for example, "CDC WSS" 900), from among the rows of the second and third output level target value table 574 (refer to FIG. 23) acquired in step S6. The output level target value setting unit 554 further specifies a column (for example, the last column) of which the cell among the cells in the fifth row from the bottom of the above second and third output level target value table 574 (refer to FIG. 23) matches above-acquired "optical circuit type of Drop unit" (for example, "CDC WSS" 902).

The output level target value setting unit 554 acquires the target value (for example, "−3" 904) recorded in the cell belonging to the above-mentioned row (for example, the last row) and the above-mentioned column (for example, the last column), among the cells of the second and third output level target value table 574 (refer to FIG. 23).

The output level target value setting unit 554 specifies a row in which "channel number" (for example, "4") acquired from the optical circuit type information table 570 (refer to FIG. 21) is recorded in the cell in the first column (for example, the fifth row), from among the rows of the second result table (refer to FIG. 28). The output level target value setting unit 554 records "Drop" in the cell in the second column of the above-specified row (for example, the fourth row). The output level target value setting unit 554 further records the target value 904 (for example, "−3") acquired from the second and third output level target value table 574 (refer to FIG. 23), in the cell in the third column of the above-specified row (for example, the fifth row).

The output level target value setting unit 554 (refer to FIG. 18) execute the above processing on all the other rows of the optical circuit type information table 570 (refer to FIG. 21) in which "Drop unit" is recorded in the cell in the second column.

As described above, the output level target value setting unit 554 of the control unit 416 (FIG. 18) specifies information indicating the type of the optical circuit included in the Add unit (which is the first multiplexing unit) through which the drop signal 18 (refer to FIG. 2) passes (hereinafter, referred to as first optical circuit information). The above-mentioned optical circuit is an optical circuit that implements the Add unit (which is the first multiplexing unit) through which the drop signal 18 passes.

The output level target value setting unit 554 further specifies information indicating the type of the optical circuit included in the Drop unit (which is the demultiplexing unit) through which the drop signal 18 (refer to FIG. 2) passes (hereinafter, referred to as fourth optical circuit information). The above-mentioned optical circuit is an optical circuit that implements the Drop unit (which is the demultiplexing unit) through which the drop signal 18 passes.

The output level target value setting unit 554 then determines the second output level target value for the drop signal based on the first optical circuit information (for example, "CDC WSS" 900) and the fourth optical circuit information (for example, "CDC WSS" 902).

The output level target value setting unit 554 may determine the second output level target value for the drop signal 18 based only on the fourth optical circuit information (for example, "CDC WSS" 902).

—Determination of Third Output Level Target Value for Through Signal (Rest of Step S8)—

The third output level target value is a target value when the dropping unit 406 (refer to FIG. 18) attenuates the through signal 20 (refer to FIG. 2).

The output level target value setting unit 554 (refer to FIG. 18) acquires "channel number" (for example, "3") and "optical circuit type of Add unit" (for example, "CD SPL" 596) in a row in which the cell in the second column has "Thru", from the optical circuit type information table 570 (refer to FIG. 21) acquired in step S4. The output level target value setting unit 554 specifies a row (for example, the fourth row from the bottom) of which the cell in the first column matches above-acquired "optical circuit type of Add unit" (for example, "CD SPL" 596), from among the rows of the second and third output level target value table 574 (refer to FIG. 23) acquired in step S6. The output level target value setting unit 554 acquires the target value (for example, "−4" 906) recorded in the second cell of the specified row (for example, the fourth row from the bottom).

The output level target value setting unit 554 specifies a row in which "channel number" (for example, "3") acquired from the optical circuit type information table 570 (refer to FIG. 21) is recorded (for example, the fourth row), from among the rows of the second result table (refer to FIG. 28). The output level target value setting unit 554 records "Thru" in the cell in the second column of the above-specified row (for example, the fourth row). The output level target value setting unit 554 further records the target value (for example, "−4" 906) acquired from the second and third output level target value table 574 (refer to FIG. 23), in the cell in the third column of the above-specified row (for example, the fourth row).

The output level target value setting unit 554 (refer to FIG. 18) execute the above processing on all the other rows (for example, the last row) of the optical circuit type information table 570 (refer to FIG. 21) in which "Thru" is recorded in the cell in the second column.

As described above, the output level target value setting unit 554 of the control unit 416 (FIG. 18) determines the third output level target value, based on the information (for example, "CD SPL" 596) indicating the type of the optical circuit that implements the Add unit (which is the second multiplexing unit) through which the through signal 20 (refer to FIG. 2) passes. The above-mentioned information (for example, "CD SPL" 596) is the second optical circuit information described earlier.

After step S8, the output level target value setting unit 554 sets the adding unit 404 with each target value in the third column and the channel number (or the wavelength) in the first column of the first result table 590 (refer to FIG. 27) (step S10). Similarly, the output level target value setting unit 554 sets the dropping unit 406 with each target value in the third column and the channel number (or the wavelength) in the first column of the second result table (refer to FIG. 28) (step S10). Step S10 may be executed after steps S12 to S14.

The amplifier average output level target value setting unit 556 (refer to FIG. 18) determines the amplification target value for the post-optical amplifying unit 410 (refer to FIG. 18) and the amplification target value for the pre-optical amplifying unit 408 (step S12).

—Determination of Amplification Target Value for Post-Optical Amplifying Unit (Part of Step S12)—

The table illustrated in FIG. 34 is also stored in "optical circuit type/output level correspondence table storage unit 550" in FIG. 18.

In the table illustrated in FIG. 34, output level target values with respect to the optical circuit type information on ADD units (which are the multiplexing units) of the pre-optical amplifying unit 408 and the post-optical amplifying unit 410 are recorded. The output level target value is a value according to the magnitude of the intensity change rate of the optical circuit of the ADD unit, and in the case of an optical circuit with a smaller intensity change rate, the output level target value is set higher accordingly. For example, the table in FIG. 34 is a correspondence table indicating target values of output levels of each of the pre-optical amplifying unit and the post-optical amplifying unit.

The amplifier average output level target value setting unit 556 in FIG. 18 acquires the information in FIG. 34 from "optical circuit type/output level correspondence table storage unit 550". Furthermore, the amplifier average output level target value setting unit 556 acquires the optical circuit type information (refer to FIG. 21) from the optical circuit type information management unit 552 in FIG. 18. The amplifier average output level target value setting unit 556 in FIG. 18 determines the output level target value of the post-optical amplifying unit 410 having a particular signal wavelength, based on the optical circuit type information for each signal wavelength (which is the wavelength or the channel (CH) of the optical signal) and the correspondence table in FIG. 34. Moreover, the amplifier average output level target value setting unit 556 calculates an average output level target value [dBm/ch] (which is the amplifier average output level target value) of all used signal wavelengths, based on the determined output level target values.

The gain of an optical amplifier 954 of the post-optical amplifying unit 410 is controlled such that the gain coincides with that value.

FIG. 33 is a diagram illustrating an example of a gain control method and the structure of the optical amplifier 954 of the post-optical amplifying unit 410. The input power is detected by a photodetector (PD) 952 and an input power detecting unit 958 at the input of the amplifier. An optical signal dropped by a drop coupler 948 is input to the PD 952. Furthermore, a wavelength number information acquiring unit 960 acquires the wavelength number information (which is the number of signal wavelengths input to the optical amplifier 954) from the device (for example, the control unit 416). An input level computing unit 962 calculates the average input level (dBm/ch) from the input power and the wavelength number information. In addition, an amplifier average output level target value acquiring unit 950 acquires the amplifier average output level target value from the device (for example, the amplifier average output level target value setting unit 556). A gain target value computing unit 964 computes the gain target value from the input level (which is the average input level) and the output level (which is the amplifier average output level target value). An automatic gain control (AGC) control unit 956 controls the optical amplifier 954 such that the optical amplifier 954 has the gain target value. The same applies to the gain control method and structure of the optical amplifier of the pre-optical amplifying unit 408.

—Determination of Amplification Target Value for Pre-Optical Amplifying Unit (Rest of Step S12)—

The amplifier average output level target value setting unit 556 acquires the information in FIG. 34 from "optical circuit type/output level correspondence table storage unit 550". Furthermore, the amplifier average output level target value setting unit 556 acquires the optical circuit type information (refer to FIG. 21) from the optical circuit type information management unit 552 in FIG. 18. The amplifier average output level target value setting unit 556 in FIG. 18 determines the output level target value of the pre-optical amplifying unit 408 having a particular signal wavelength, based on the optical circuit type information for each signal wavelength (which is the wavelength or CH of the optical signal) and the correspondence table in FIG. 34. Moreover, the amplifier average output level target value setting unit 556 calculates an average output level target value [dBm/ch] (which is the amplifier average output level target value) of all used signal wavelengths, based on the determined output level target values. The gain of an optical amplifier 954 of the pre-optical amplifying unit 408 is controlled such that the gain coincides with that value.

The amplifier average output level target value setting unit 556 (refer to FIG. 18) sets the post-optical amplifying unit 410 with the amplification target value for the post-optical amplifying unit 410 determined in step S12 (step S14). The amplifier average output level target value setting unit 556 (refer to FIG. 18) further sets the pre-optical amplifying unit 408 with the amplification target value for the pre-optical amplifying unit 408 determined in step S12 (step S14).

The first output level target value is set in the control module 524 of the post-WSS 604 in step S10, and the control module 524 controls the optical module 523 of the post-WSS 604 in accordance with the set first output level target value. The second and third target values are further set in the control module 524 of the pre-WSS 504 in step S10, and the control module 524 controls the optical module 523 of the pre-WSS 504 in accordance with the set second and third target values.

The amplification target value for the post-optical amplifier 510 is set in the power supply 530 of the post-optical amplifier 510 in step S14, and the power supply 530 controls the excitation light source 528 in accordance with the set amplification target value. The amplification target value for the pre-optical amplifier 610 is further set in the power supply 530 of the pre-optical amplifier 610 in step S14, and the power supply 530 controls the excitation light source 528 in accordance with the set amplification target value.

The output level target values for the dropping unit 406, the adding unit 404, the pre-optical amplifying unit 408, and the post-optical amplifying unit 410 are preferably set to values proportional to the intensity change rate of the optical circuit of the multiplexing unit when adding the optical signal wavelength (which is the optical signal).

Figure 35:
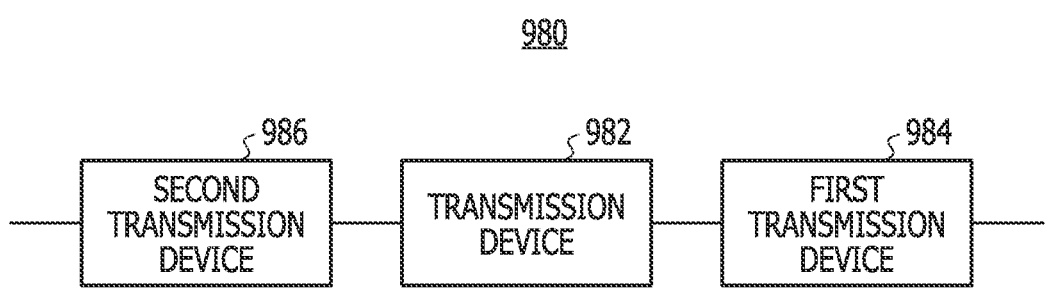
FIG. 35 is a diagram illustrating an example of an optical add-drop system 980 using the optical add-drop multiplexer 202.

FIG. 35 is a diagram illustrating an example of an optical add-drop system 980 using the optical add-drop multiplexer 202. The optical add-drop multiplexer 202 is housed in a transmission device 982 and connected to each of a first transmission device 984 and a second transmission device 986. The first transmission device 984 is a transmission device on a downstream side with respect to the flow of optical signals. The second transmission device 986 is a transmission device on an upstream side with respect to the flow of optical signals.

Figure 29:
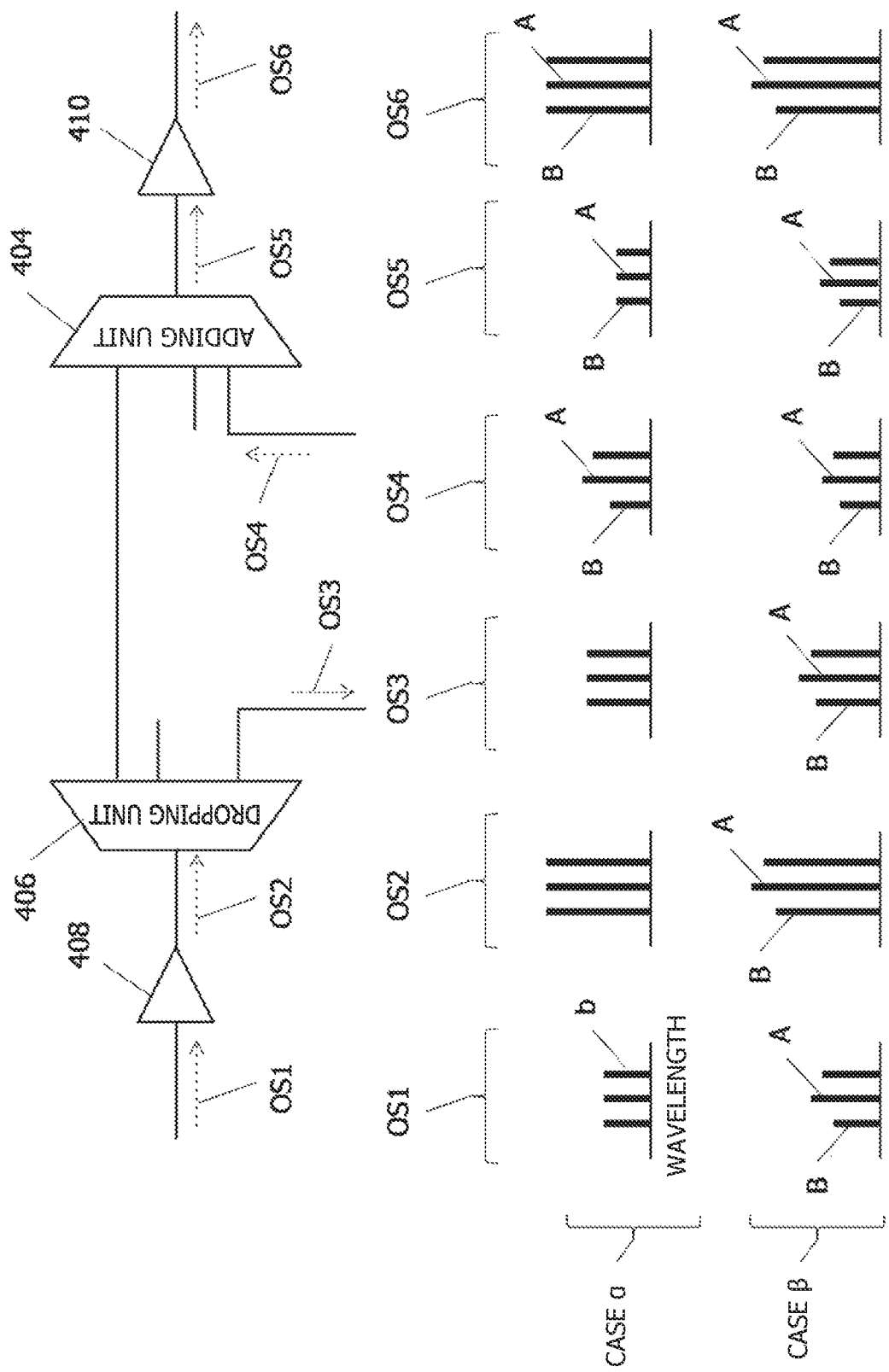
FIG. 29 is a diagram illustrating an example of spectra of optical signals processed by the optical add-drop multiplexer 202.

FIG. 29 is a diagram illustrating an example of spectra of optical signals processed by the optical add-drop multiplexer 202. The upper part of FIG. 29 illustrates a schematic diagram of the optical add-drop multiplexer 202. The central part of FIG. 29 illustrates an example of spectra of optical signals in case α in which the first to third target values are set to be fixed, regardless of the intensity change rate of the optical circuit.

The lower part of FIG. 29 illustrates an example of spectra of optical signals in case β in which the first to third target values are set according to the intensity change rate of the optical circuit. The horizontal axis of each spectrum denotes the wavelength. The length of a vertical bar b represents the light intensity (which is power). Case β is an example of the second embodiment.

The spectrum in the first column counted from the left side of FIG. 29 indicates the spectrum of an optical signal OS1 input to the pre-optical amplifying unit 408. The spectrum in the second column counted from the left side of FIG. 29 indicates the spectrum of an optical signal OS2 output from the pre-optical amplifying unit 408 before being input to the dropping unit 406. The spectrum in the third column counted from the left side of FIG. 29 indicates the spectrum of an optical signal OS3 output from the dropping unit 406 before being input to the adding unit 404.

The spectrum in the fourth column counted from the left side of FIG. 29 indicates the spectrum of an optical signal OS4 output from the multiplexing unit before being input to the adding unit 404. The spectrum in the fifth column counted from the left side of FIG. 29 indicates the spectrum of an optical signal OS5 output from the adding unit 404 before being input to the post-optical amplifying unit 410. An optical signal OS6 in the sixth column counted from the left side of FIG. 29 indicates the spectrum of the optical signal OS6 output from the post-optical amplifying unit 410.

In case α, the optical signal OS4 that has passed through the multiplexing unit is attenuated to a certain intensity by the adding unit 404 and then input to the post-optical amplifying unit 410 (refer to the optical signal OS5 in case α). In case α, since the first to third target values are set in line with a multiplexing unit that outputs a weakest optical signal B (which is an optical circuit with the largest loss), a strongest optical signal A is attenuated to the same intensity as the intensity of the weakest optical signal B (for example, −20 dBm). Therefore, the optical signal-to-noise ratio of the optical signal A when output from the post-optical amplifying unit 410 obtains a low value to the same extent as the optical signal-to-noise ratio of the optical signal B when output from the post-optical amplifying unit 410.

On the other hand, in case β, a strongest optical signal A at the time of passing through the multiplexing unit is attenuated to a relatively strong intensity (for example, −17 dBm) according to a loss of the multiplexing unit through which the optical signal A has passed, and then is input to the post-optical amplifying unit 410. Therefore, in case β, the optical signal-to-noise ratio of the optical signal A when output from the post-optical amplifying unit 410 becomes higher than the optical signal-to-noise ratio in case α (which is the optical signal-to-noise ratio of the optical signal A when output from the post-optical amplifying unit 410 in case α).

As indicated by the spectra of the optical signals OS6 and OS1 to OS3 in case β, the optical signal A remains stronger than the optical signal B even after being output from the post-optical amplifying unit 410.

Therefore, according to case β (which is an example of the second embodiment) in which the first to third target values are set according to the intensity change rate (which is loss) of the multiplexing unit through which the optical signal passes, the optical signal-to-noise ratio of the optical signal A that passes through a multiplexing unit with a small loss is enhanced.

Note that it is also conceivable to set the first to third target values in line with the intensity change rate of the multiplexing unit that outputs the strongest optical signal A (which is the multiplexing unit with the smallest loss). However, in this case, the intensity of the optical signal B output from the adding unit 404 is not allowed to reach the target value. Then, the intensity of the optical signal A when output from the post-optical amplifying unit 410 becomes excessively strong. As a result, a non-linear effect due to the optical signal A on the optical line becomes apparent and the transmission performance deteriorates.

(3) MODIFICATION EXAMPLES

(3-1) First Modification Example

In the above examples, the type of optical circuit (for example, "CD SPL" or the like) is used to identify the optical circuit of each of the Add unit and the Drop unit. However, in order to identify the optical circuits of the Add unit and the Drop unit, information other than the type of optical circuit may be used. For example, in order to identify the optical circuits of the Add unit and the Drop unit, the intensity change rate (which is loss) of the optical circuit may be used.

Alternatively, in order to identify the optical circuits of the Add unit and the Drop unit, a group obtained by classifying the types of optical circuits may be used.

Figure 30:
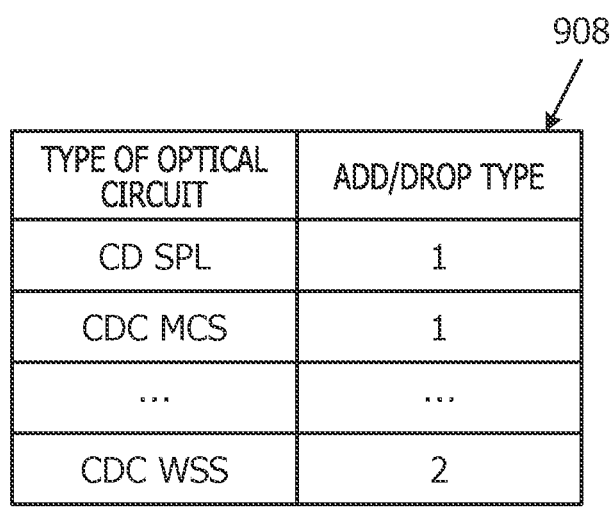
FIG. 30 is a diagram illustrating an example of group names of optical circuits used in an Add unit and a Drop unit.

FIG. 30 is a diagram illustrating an example of groups of optical circuits used for identifying the Add unit and the Drop unit. The types of optical circuits used in the Add unit and the Drop unit are illustrated in the first column of a table 908 in FIG. 30. An Add/Drop type (which is the group name) to which each optical circuit (for example, "CD SPL") belongs is illustrated in the second column of the table 908.

According to the first modification example, the optical circuit information (refer to FIG. 21) and the output level target value (FIGS. 22 and 23) and the like may be simplified.

(3-2) Second Modification Example

In the above examples, the first output level target value (which is the target value for the optical signal that passes through the adding unit 404) is set to a value according to the intensity change rate (which is loss) of the optical circuit through which the optical signal first passes (which is the optical circuit of the multiplexing unit). However, the first output level target value may be set to a value according to both of the intensity of the optical signal output from a device that generates the optical signal (for example, a transceiver) and the intensity change rate of an optical circuit through which the optical signal first passes (which is the multiplexing unit).

FIG. 31 depicts a table 910 illustrating an example of the first output level target values set to values according to the intensity of the add signal 22 output from a device (for example, a transceiver) that generates the optical signal and the intensity change rate of an optical circuit through which the add signal 22 first passes (which is the multiplexing unit). The types of the optical circuit used in the Add unit (which is the multiplexing unit) are illustrated in the first column of the table 910.

The types of the transceiver that generates the optical signal that passes through the Add unit (which is the multiplexing unit) in the first column are illustrated in the second column of the table 910. "High-output type TRPN" generates an optical signal stronger than optical signals generated by other types of transceivers (for example, a normal type TRPN and a low-output type TRPN). "Low-output type TRPN" generates an optical signal weaker than optical signals generated by other types (for example, the normal type TRPN and the high-output type TRPN).

The first output level target values for the add signal 22 (which is Add CH) that passes through the adding unit 404 (which is the post-WSS) are illustrated in the third column of the table 910.

Even for the same optical circuit of the Add unit, the first output level target value recorded in the third column is greater as the output of the transceiver that generates the add signal 22 is stronger. For example, even if the optical circuit types of the Add units (for example, CD SPL) are identical, the first output level target value (for example, −17 dBm) of the add signal 22 generated by a high-output type TRPN 912 is greater than the first output level target value (for example, −21 dBm) for the add signal 22 generated by a low-output type TRPN 914.

According to the second modification example, since the first output level target value can be set according to the output intensity of a device that inputs the optical signal to the Add unit (for example, a transceiver), the optical signal-to-noise ratio of the optical signal output from a device with a high output intensity may be raised.

(3-3) Third Modification Example

In the above examples, the second output level target value (which is the target value for the drop signal 18) is set to a value according to the intensity change rate (which is loss) of the optical circuit through which the optical signal last passes (which is the optical circuit of the demultiplexing unit). However, the second output level target value may be set to a value according to the sensitivity of a device that photoelectrically converts the optical signal (for example, a transceiver) and the intensity change rate of an optical circuit through which the optical signal (here, the drop signal) last passes (which is the demultiplexing unit).

FIG. 32 depicts a table 916 illustrating an example of the second output level target values set to values according to the sensitivity of a device that photoelectrically converts the drop signal 18 (for example, a transceiver) and the intensity change rate (which is loss) of an optical circuit through which the drop signal 18 last passes (which is the demultiplexing unit). The types of the optical circuit used in the Drop unit (which is the demultiplexing unit) are illustrated in the first column of the table 916.

The types of the transceiver that photoelectrically converts the drop signal 18 that passes through the Drop unit (which is the demultiplexing unit) in the first column are illustrated in the second column of the table 916. The sensitivity of "high-sensitivity type TRPN" (which is the lowest detectable signal intensity) is higher than the sensitivity of other types of transceivers (for example, a normal type TRPN and a low-sensitivity type TRPN). The sensitivity of "low-sensitivity type TRPN" is lower than the sensitivity of other types (for example, the normal type TRPN and the high-sensitivity type TRPN).

The second output level target values for the drop signal 18 (which is Drop CH) that passes through the dropping unit 406 (which is the pre-WSS) are illustrated in the third column of the table 916.

Even for the same type of optical circuit of the Drop unit, the second output level target value recorded in the third column of the table 916 is lower as the sensitivity of the transceiver that receives the drop signal 18 is higher.

For example, even if the optical circuit types of the Drop units (for example, CD SPL) are identical, the second output level target value (for example, −5 dBm) of the drop signal 18 received by a high-sensitivity type TRPN 918 is lower than the second output level target value (for example, 0 dBm) for the drop signal 18 received by a low-sensitivity type TRPN 920.

According to the third modification example, since the second output level target value can be set according to the sensitivity of a transceiver that receives the optical signal that has passed through the Drop unit (which is the drop signal 18), sensitivity adjustment for the transceiver may be omitted.

According to the second embodiment, as in the first embodiment, since the intensity of the optical signal is controlled according to the loss of the optical circuit (which is the multiplexing unit) through which the optical signal passes, the excessive attenuation of the optical signal may be suppressed, and the optical signal-to-noise ratio of the optical signal that passes through an optical circuit with a small loss may be improved.

Moreover, according to the second embodiment, since the dropping unit 406 and the adding unit 404 are controlled based on the first optical circuit information to the fourth optical circuit information indicating the type of the optical circuit (for example, "CDC MCS"), the dropping unit 406 and the adding unit 404 may be more easily controlled.

While the embodiments have been described above, the first and second embodiments are merely illustrative and not restrictive. For example, in the first and second embodiments, the intensity change rates of the first to third multiplexing units are smaller than 0 dB. However, the intensity change rates of some or all of the first to third multiplexing units may be greater than 0 dB. For example, some or all of the first to third multiplexing units may include an optical amplifier that amplifies input optical signals (which are add light, through light, and drop light).

In the first and second embodiments, the first optical circuit information and the second optical circuit information are conveyed to the optical add-drop multiplexers 2 and 202 by the OSC transfer signal. However, the first optical circuit information and the second optical circuit information may be conveyed by a signal other than the OSC transfer signal. For example, the first optical circuit information and the second optical circuit information may be conveyed to the optical add-drop multiplexers 2 and 202 by a signal from the NMS.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus that adds and drops wavelength division multiplexed signal, the apparatus comprising:
    a memory configured to store a first correspondence table indicating relationship with between an optical circuit type information and a first output level target value for a dropping circuit; and
    a processor configured to determine an output level target value for the dropping circuit for each signal wavelength, based on the first correspondence table and optical circuit type information of each signal wavelength.

2. The apparatus according to claim 1, wherein
    the memory stores a second correspondence table indicating relationship with between the optical circuit type information and a second output level target value for an adding circuit, and
    the processor determines an output level target value for the adding circuit for each signal wavelength, based on the second correspondence table and the optical circuit type information of each signal wavelength.

3. The apparatus according to claim 1, wherein the processor acquires optical circuit type information of the signal wavelength when the signal wavelength is added.

4. The apparatus according to claim 3, further comprising a transceiver configured to transmit to a first transmission device the acquired optical circuit type information.

5. The apparatus according to claim 1, further comprising:
    a transceiver configured to:
    receive from a second transmission device the optical circuit type information, and
    transmit to a first transmission device the received optical circuit type information.

6. The apparatus according to claim 1, wherein
    the memory stores a third correspondence table indicating relationship with between the optical circuit type information and a third output level target value for a pre-optical amplifier, and
    the processor determines an average output level target value for the pre-optical amplifier based on the third correspondence table, and optical circuit type information of each signal wavelength.

7. The apparatus according to claim 6, wherein
the memory stores a fourth correspondence table indicating relationship with between an optical circuit type information and a third output level target value for a post-optical amplifier, and
the processor determines an average output level target value for the post-optical amplifier based on the third correspondence table, and optical circuit type information of each signal wavelength.

8. The apparatus according to claim 7, wherein
the output level target values for the dropping unit, the adding unit, the pre-optical amplifier, and the post-optical amplifier are set to values proportional to intensity change rates of optical circuits when an optical signal wavelength is added.

9. The apparatus according to claim 8, wherein
gain target values for the pre-optical amplifier and the post-optical amplifier are determined from an input power measurement value, wavelength number information, and the average output level target values.

10. An apparatus that adds and drops wavelength division multiplexed signal, the apparatus comprising:
a memory configured to store a first correspondence table indicating relationship with between an optical circuit type information and a first output level target value for an adding circuit; and
a processor configured to determine an output level target value for the adding circuit for each signal wavelength, based on the first correspondence table and optical circuit type information of each signal wavelength.

11. An adding and dropping method for wavelength division multiplexed signal, the method comprising:
storing a first correspondence table indicating relationship with between an optical circuit type information and a first output level target value for a dropping circuit; and
determining an output level target value for the dropping circuit for each signal wavelength, based on the first correspondence table and optical circuit type information of each signal wavelength.

12. The adding and dropping method according to claim 11, further comprising:
storing a second correspondence table indicating relationship with between the optical circuit type information and a second output level target value for an adding circuit, and
determining an output level target value for the adding circuit for each signal wavelength, based on the first correspondence table and optical circuit type information of each signal wavelength.

* * * * *